United States Patent
Yasuda et al.

(10) Patent No.: US 7,587,471 B2
(45) Date of Patent: Sep. 8, 2009

(54) SYSTEM AND METHOD FOR VIRTUALIZING NETWORK STORAGES INTO A SINGLE FILE SYSTEM VIEW

(75) Inventors: Yoshiko Yasuda, Tokorozawa (JP); Tatsuo Higuchi, Fuchu (JP); Shinichi Kawamoto, Hachioji (JP); Atsushi Ebata, Kokubunji (JP); Jun Okitsu, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 691 days.

(21) Appl. No.: 10/387,382

(22) Filed: Mar. 14, 2003

(65) Prior Publication Data

US 2004/0010654 A1 Jan. 15, 2004

(30) Foreign Application Priority Data

Jul. 15, 2002 (JP) ............................. 2002-205002

(51) Int. Cl.
G06F 15/177 (2006.01)
G06F 15/173 (2006.01)
G06F 9/455 (2006.01)

(52) U.S. Cl. ..................... 709/220; 709/223; 718/1
(58) Field of Classification Search ............... 709/219, 709/201, 220, 223; 718/1
See application file for complete search history.

(56) References Cited

U.S. PATENT DOCUMENTS

| 6,898,670 B2 | 5/2005 | Nahum |
| 6,990,667 B2 * | 1/2006 | Ulrich et al. ............ 718/105 |
| 7,010,622 B1 * | 3/2006 | Bauer et al. ............ 709/252 |
| 2002/0019908 A1 * | 2/2002 | Reuter et al. ............ 711/112 |
| 2002/0133491 A1 | 9/2002 | Sim et al. |
| 2002/0161983 A1 * | 10/2002 | Milos et al. ............ 711/202 |
| 2003/0037061 A1 * | 2/2003 | Sastri et al. ............ 707/103 R |
| 2003/0079083 A1 * | 4/2003 | Lubbers et al. ............ 711/114 |
| 2003/0115218 A1 * | 6/2003 | Bobbitt et al. ............ 707/200 |
| 2003/0144894 A1 * | 7/2003 | Robertson et al. ............ 705/8 |
| 2003/0182501 A1 | 9/2003 | George et al. |
| 2004/0030822 A1 | 2/2004 | Rajan et al. |

FOREIGN PATENT DOCUMENTS

| JP | 5-241934 | 9/1993 |
| JP | 2001-51890 | 2/2001 |
| JP | 2002-99519 | 4/2002 |

* cited by examiner

Primary Examiner—William C Vaughn, Jr.
Assistant Examiner—Ranodhi N Serrao
(74) Attorney, Agent, or Firm—Brundidge & Stanger, P.C.

(57) ABSTRACT

A system and method for virtualizing a new network storage additionally installed and an existing network storage as a single file system by inheriting a directories tree structure from the existing network storage, wherein a virtualizing system of the new network storage has the function of reading out setup information of the existing network storage according to an expansion request from the administrator, registering the existing network storage as a member of the virtualizing system, copying a directories tree structure of the existing network storage, and swapping setup information of the existing network storage and that of he new network storage with each other.

5 Claims, 23 Drawing Sheets

FILE HANDLE 200

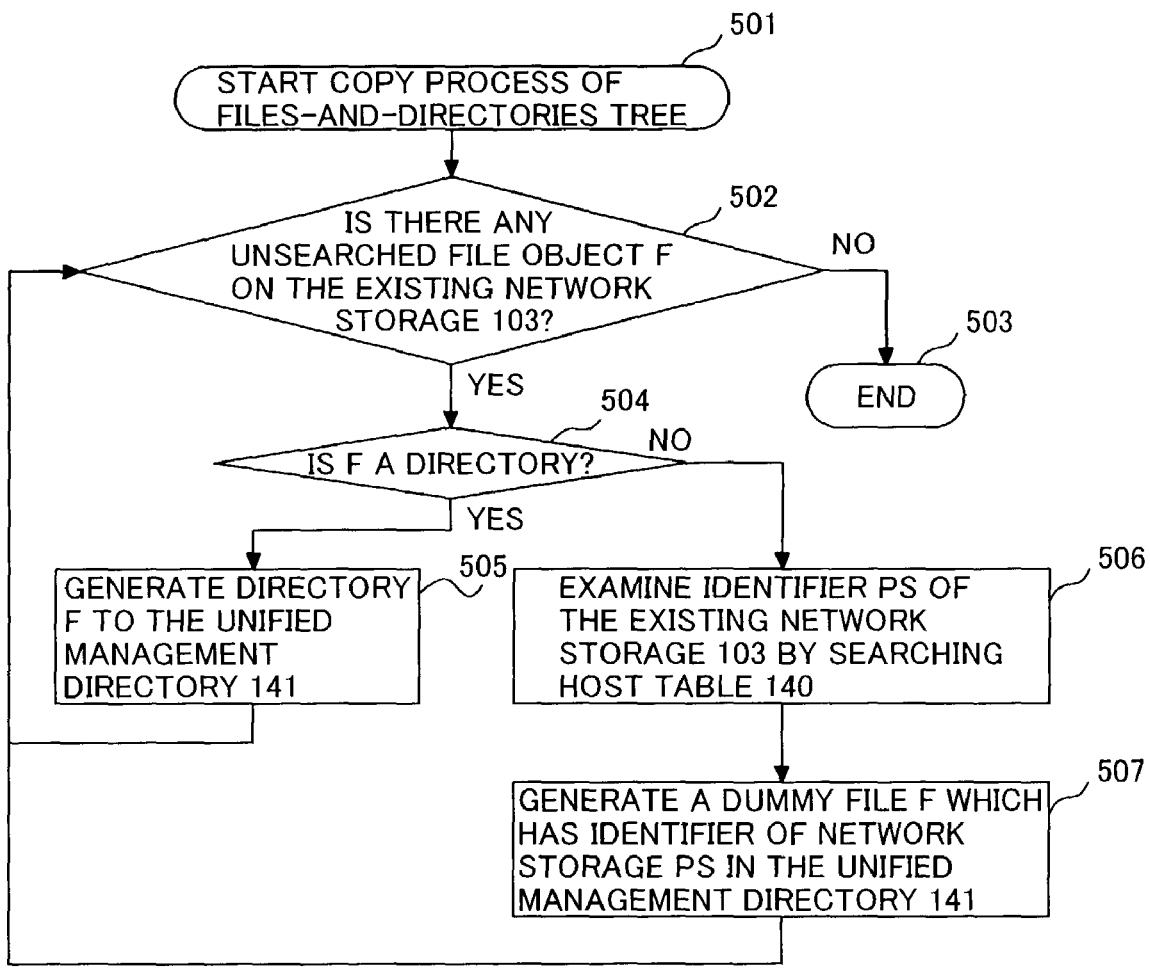

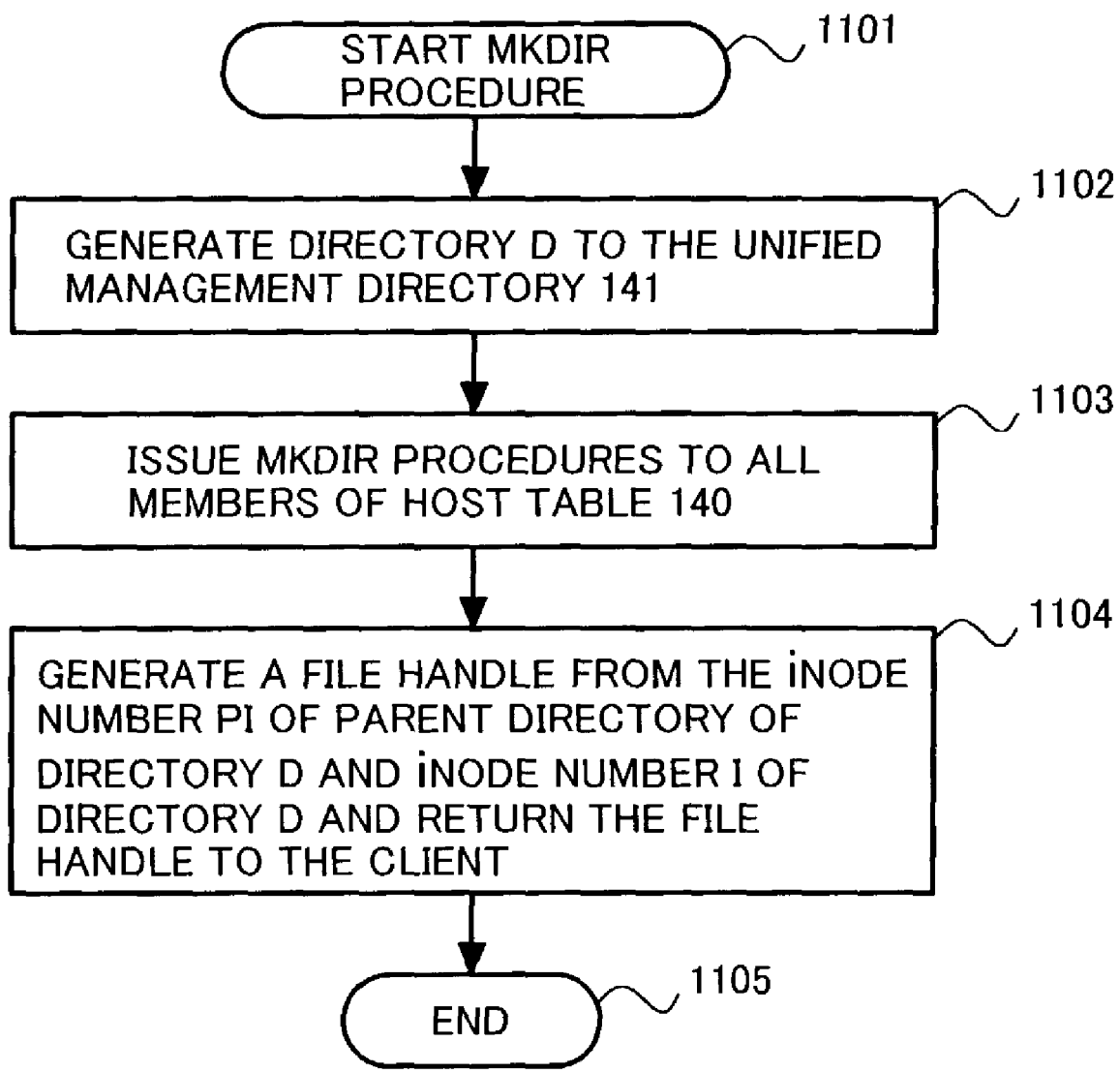

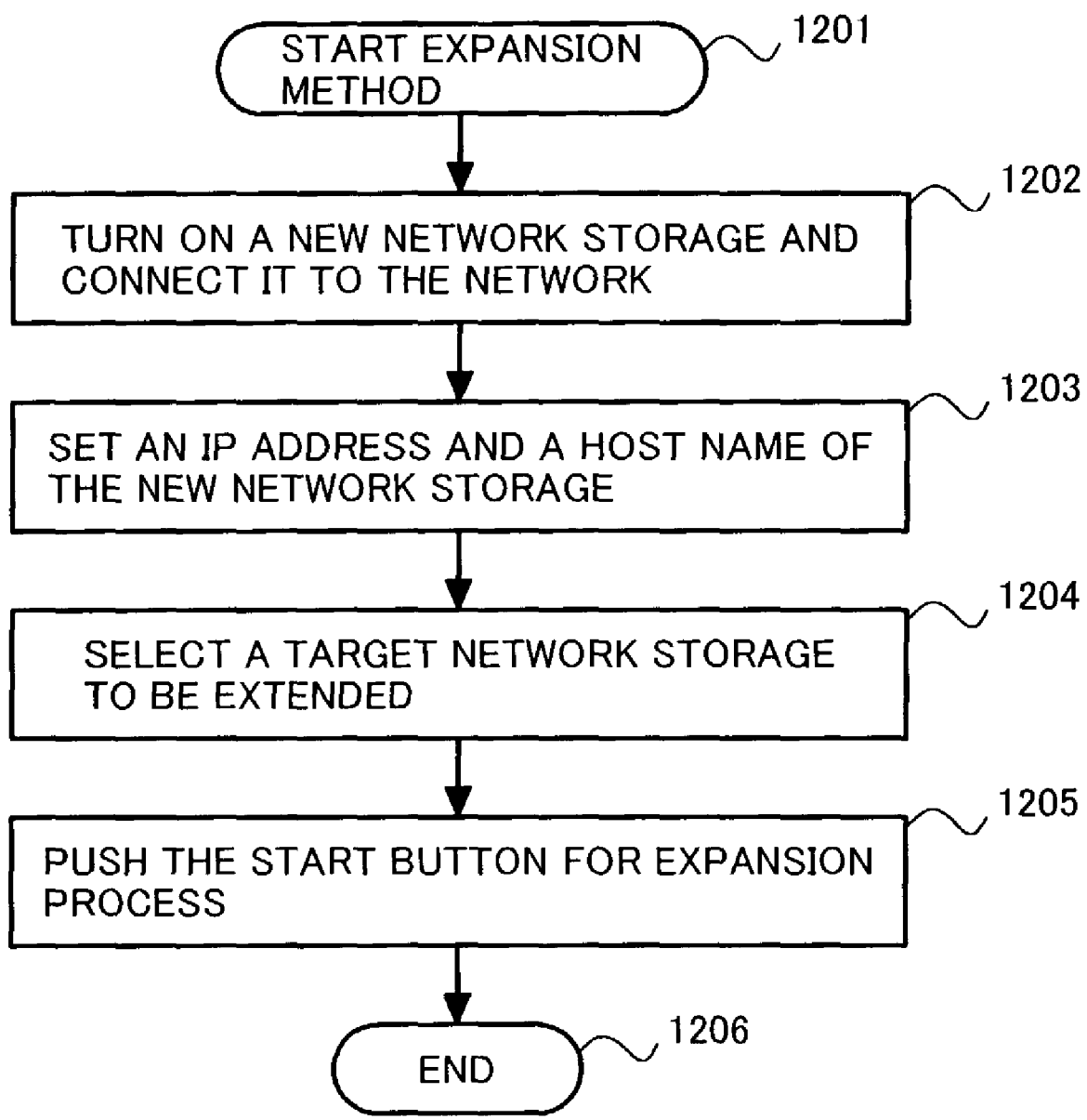

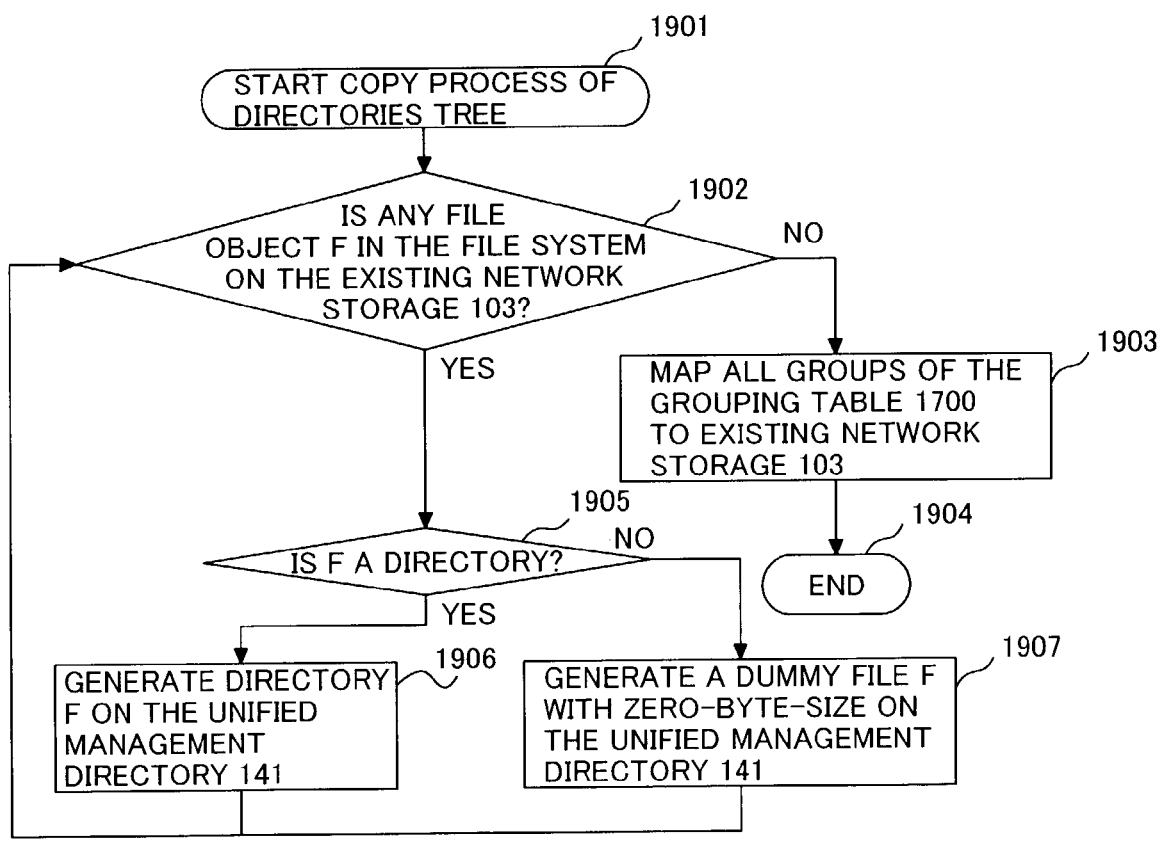

SYSTEM AND METHOD FOR VIRTUALIZING NETWORK STORAGES INTO A SINGLE FILE SYSTEM VIEW

BACKGROUND OF THE INVENTION (1) Field of the Invention

The present invention relates to a method for virtualizing a plurality of network storages and, more particularly, to a system and method for making a client computer virtually see a plurality of file systems as a single file system.

(2) Description of the Related Art

Hitherto, data is stored in a storage (DAS: Direct Attached Storage) directly connected to a client computer. Since data on a DAS can be accessed only via a client computer directly connected to the DAS, in the case where a client computer accesses data of a DAS connected to another client computer, the client computer has to access the data via the computer to which the DAS is connected.

However, because of development of network technologies of recent years, the amount of data to be stored in each client computer is rapidly increasing. In association with the increase, needs of efficient management of the data are increasing, and a storage system connected to a network (network storage) is being introduced in place of the DAS. By the introduction of the network storage, sharing of data among a plurality of client computers is enabled, and an administrator can efficiently manage shared data As examples of the network storage, there are an SAN (Storage Area Network) storages connected to an SAN, for providing a block access, and an NAS (Network Attached Storage) for providing a file access, connected to the IP network, an infiniband, or the like. Among them, the NAS is expanding its market because it is cheaper than the SAN storage and by which a plurality of client computers can easily share a file by using a plurality of standard file access protocols such as NFS (Network File System) and CIFS (Common Internet File System).

As described above, the network storage is very popular since the administrator can efficiently manage shared data of a plurality of client computers in a lump. However, as a result of further increase in a shared data amount handled by a plurality of client computers as the network technologies develop, it is becoming difficult to store all of data by a single network storage. When the amount of data to be stored exceeds the capacity of a single network storage, the administrator has to prepare a new network storage and perform the following work.

First, the administrator connects the new network storage to the network and sets basical information such as an IP address and a name to the network storage. After that, the administrator has to set the sharing information for indicating which of the plurality of network storages should be shared by a plurality of client computers. For example, it is assumed that when a new network storage is added in a state where two client computers share a network storage, the administrator changes the setups so that a first client computer uses the existing network storage and a second client computer uses the new network storage. In the case of changing the sharing setting information among a plurality of client computers as described above, the administrator has to explicitly move the data of the second client computer on the existing network storage to the new network storage. The larger the number of network storages to be managed is, the higher the administration cost is.

As a method of suppressing the administration cost, a network storage virtualizing technique for virtualizing a plurality of network storages so as to be sensed by a client computer virtually as single storage system is proposed, in order to prevent an influence from being exerted on a whole system even when a new network storage is added.

For example, Japanese Patent Laid-open No. 2002-99519 (first prior art) discloses a method of constructing a dynamic file server system for virtualizing a plurality of file server systems connected to a network so as to be sensed by a client as a single dynamic virtual file server, in the case where the capacity of an existing file server is becoming short and is desired to be increased, without requiring expert knowledge of adding a disk to an existing file server and devices and work for extension. When a server computer transmits declaration information indicating that the server computer becomes a member of a dynamic virtual file server onto the network, each of the members of the dynamic virtual file server receives the declaration information, interprets the contents, and updates management information of the dynamic virtual file server. By adding the server system which has transmitted the declaration information as a new member of the dynamic virtual server, the storage capacity can be extended during operating the dynamic virtual file server.

Japanese Patent Laid-open No 2001-51890 (second prior art) discloses a virtual distributed file server system which does not make a client aware of the number of a plurality of file servers distributed on a network and a connection state of a storage. The virtual distributed file server system is distributed to a plurality of file servers connected to a network which can multicast. Each file server has a mapping table for holding mapping information between the virtual distributed file server system and a local file system for actually managing a file. Upon receiving a file access request multicasted from a client, each file server refers to the mapping table, and performs a file access operation on a local file system in the server only when the file server recognizes that the file server itself is the optimum one for processing the request. Since the client accesses a plurality of file servers distributed on the network via the virtual distributed file server, the system can be expanded without making the client aware of the existence of the plurality of file servers.

Japanese Patent Laid-open No. Hei 5-241934 (third prior art) discloses a virtual file system having the function of virtually showing a plurality of file systems as a single file system irrespective of an actual layout state. The virtual file system exists in one of a plurality of servers, manages the plurality of file systems in a single tree structure, and accepts file access requests from all of clients. A client issues a file access request to the server in which the virtual file system exists. When the file access request is received, the virtual file system investigates a file system of the server in which the requested file exits, issues an access request to the server in which the requested file exists, and transmits data obtained from the server to the client. It is sufficient for the clients and each of the members of the virtual file system to know only information of the virtual file system. Accordingly, a system change caused by adding a server can be easily realized.

However, the network storage virtualizing technique disclosed in the first, second, and third prior arts have been achieved on the premise that, in the case of adding a new network storage, existing network storages are already managed in a unified way by a virtualized-and-unified file system. In addition, all of members belonging to the virtualized-and-unified file system have to be provided with information regarding virtualization.

For example, in the first prior art, all of members belonging to the virtualized-and-unified file system have to possess information of members constructing the virtualized-andunified file system. In the second prior art, all of members belonging to the virtualized-and-unified file system have to possess mapping information for correlating the virtualized-and-unified file system and a local file system. In the third prior art, all of members have to possess information of the server in which the virtualized-and-unified file system exists.

Generally, in the case of introducing a network storage, the administrator has not imagined that the capacity becomes short. Therefore, the administrator purchases one network storage, and starts operating it in an office or the like. When the capacity becomes short, the administrator purchases a new network storage. In a state where only one network storage operates, the virtualizing function is not necessary for the network storage in operation because it is unnecessary to virtually unify the network storage.

Only after a new network storage is purchased due to a capacity shortage, the administrator tries to manage the network storages in a unified manner in order to reduce administration cost. However, according to the known methods, since the existing network storage does not have the virtualizing function, the administrator cannot virtualize the network storages while maintaining a directories tree structure of the existing network storage. To solve the problem, in the case of adding a new network storage in a state where the existing network storage is operating without using the virtualizing function, it is necessary to realize virtualization while maintaining the directories tree structure of the existing network storage.

In most of the cases, the network storage is offered as an appliance. In order to reduce administration cost, in general, an appliance limits the setup information which can be changed by the administrator. Consequently, when the administrator tries to manage the existing network storage in a unified manner, which has been operated without virtualization functions, the administrator cannot set special information for virtualizing as described above. As a result, unified management cannot be realized. To solve the problem, in the case of managing an existing network storage and a new network storage in a virtually unified manner, it is required to realize the virtualization without setting special information into the existing network storage.

Further, in a state where the existing network storage is shared by a plurality of client computers, sharing setting information in the client computers have to be changed so as to be adapted to the new network storage, even if a new network storage additionally provided and an existing network storage can be virtually unified. To change the sharing setting information, the operation of each client computer has to be stopped once, so that administration cost increases. To solve the problem, the existing network storage and the new network storage have to be virtually unified without changing the sharing setting information of the network storages in the client computers, that is, while allowing the client computers to continuously share the existing network storage.

SUMMARY OF THE INVENTION

A first object of the invention is to provide a virtualizing method capable of increasing capacity of an existing network storage by easily inheriting a files-and-directories tree structure from the existing network storage in the case where the capacity of the existing network storage becomes short and an administrator add a new network storage, even if the existing network storage does not have a virtualizing function.

A second object of the invention is to provide a virtualizing method capable of easily managing an existing network storage and a new network storage in a virtually unified manner without setting special information to the existing network storage.

A third object of the invention is to provide a virtualizing method capable of easily managing an existing network storage and a new network storage in a virtually unified manner without changing sharing setting information of the existing network storage in a client computer.

According to the invention, the first object is achieved by providing a virtualizing system on a new network storage with: a unified management directory for managing a file system of an existing network storage and a file system of a new network storage in a single files-and-directories tree structure; a table for holding information of members of the virtualizing system; managing means for managing the whole virtualizing system in accordance with a configuration change request from an administrator; setup information reading means for reading out setup information of the existing network storage which is not virtualized; member registering means for registering the existing network storage as a member of the virtualizing system; and means for copying a directories tree structure on a file system mounted on the existing network storage to the unified management directory by using the read out setup information.

According to the invention, the second object is achieved by providing a virtualizing system on a new network storage with, in addition to the means for achieving the first object, mapping means for determining a network storage in which a target file is stored, and request processing means for accessing a network storage determined by the mapping means by using a standard file access protocol when a file access request from a client computer.

According to the invention, the third object is achieved by providing, in addition to the means for achieving the first and second objects, setup information swapping means for swapping setup information of the existing network storage and setup information of the new network storage with each other.

According to the invention, in the case where the capacity of an existing network storage which is not virtualized becomes short and a new network storage is added, a virtualizing system on the new network storage reads out setup information from the existing network storage, registers the existing network storage as a member of the virtualizing system, and copies a directories tree structure on a file system mounted on the existing network storage to the virtualizing system of the new network storage, whereby the existing network storage and the new network storage are virtually unified by inheriting the directories tree structure and the file structure from the existing network storage.

According to the invention, when a file access request is issued from the client computer, the virtualizing system accepts the file-access request, specifies a network storage in which a file to be accessed exists by using the mapping means, and issues a file-access request in accordance with a standard file access protocol to the specified network storage. With such a configuration, the existing network storage which is not virtualized and the new network storage can be managed in a virtually unified manner without setting special information to the existing network storage.

Further, according to the invention, the virtualizing system on the new network storage replaces setup information of the existing network storage with setup information of the new network storage, and the new network storage replaces the existing network storage, whereby the existing network storage and the new network storage can be virtualized without changing the shared setups of the network storage in the client computer.

BRIEF DESCRIPTION OF THE DRAWINGS

FIG. 4 is a diagram showing the configuration of a host table 140 in the embodiment.

FIG. 5 is a diagram showing the flow of a directories tree copying process in the embodiment.

FIG. 11 is a diagram showing the flow of an MKDIR procedure in the file access requests processing unit 131 in the embodiment.

FIG. 12 is a diagram showing a network storage expansion method performed by an administrator in the embodiment.

FIG. 18 is a diagram showing the configuration of a grouping table 1700 in the first modification.

FIG. 19 is a diagram showing the flow of a directories tree copying process in the first modification.

DESCRIPTION OF THE PREFERRED EMBODIMENTS

1. Representative Embodiment of the Invention

Figure 1:
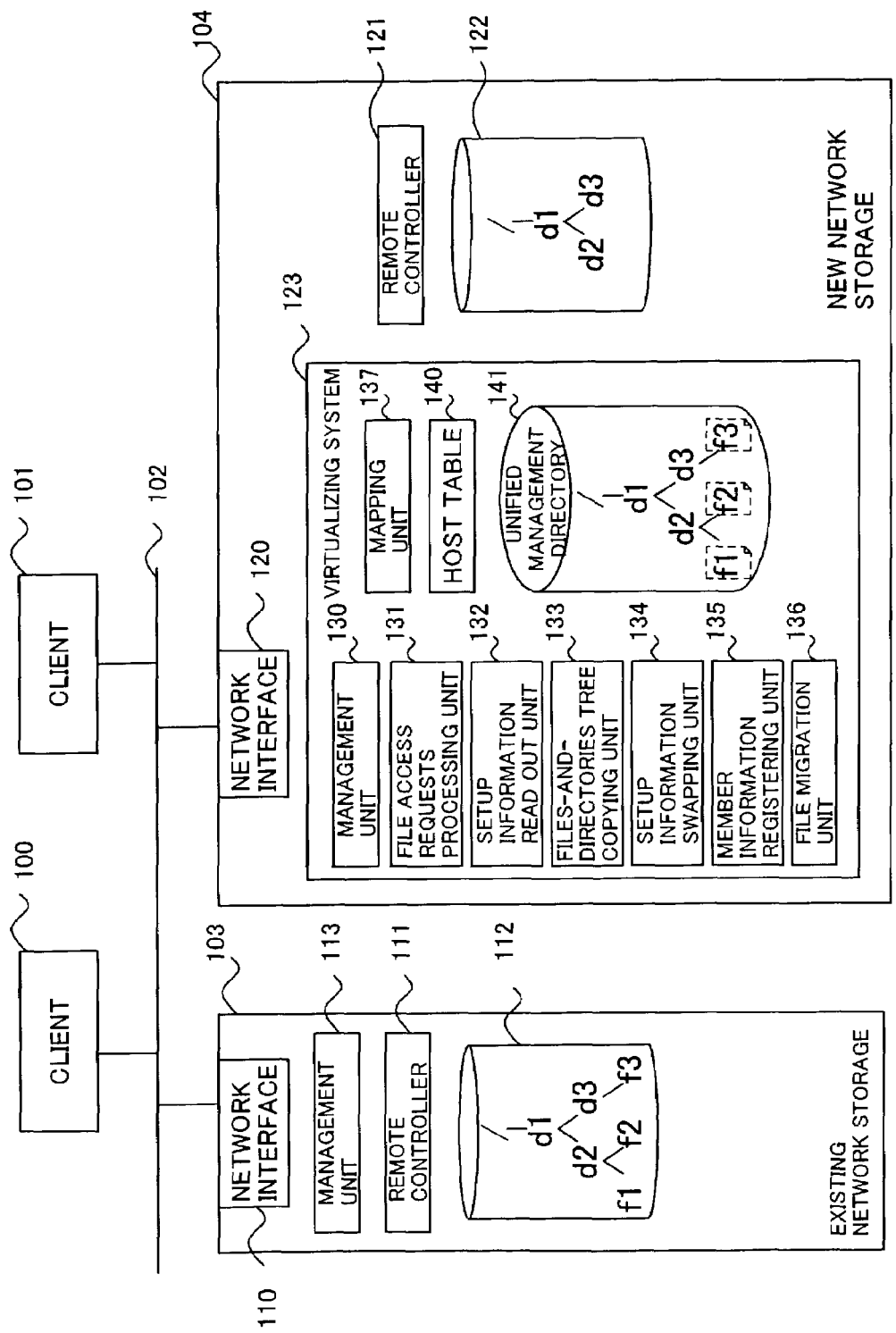
FIG. 1 is a diagram showing a general configuration of a network storage system in a representative embodiment of the invention.

FIG. 1 shows a network storage system as an embodiment of the invention.

The network storage system is comprised of clients 100 and 101, a network 102, an existing network storage 103, and a new network storage 104.

In the following description, a case where the new network storage 104 is added to compensate capacity shortage of the existing network storage 103 in a state where the clients 100 and 101 share files only in the existing network storage 103 will be described in detail. In the embodiment, since the existing network storage 103 can be replaced with the new network storage 104 by performing a process equivalent to the expansion process, the replacing process will be also described in detail.

In a state where the new network storage 104 is not connected to a network 102, the clients 100 and 101 issue file access requests to the existing network storage 103 only. The clients 100 and 101 access the existing network storage 103 (or new network storage 104) via the network 102 through an NFS (Network File System) client program or a CIFS (Common Internet File System) client program. Although the NFS and CIFS are mentioned as examples of the client program, any of the other standard file access protocols may be used. As examples of the other file access protocols, there are AFP (Apple File Protocol) and NCP (Netware Core Protocols), for example.

The existing network storage 103 is comprised of a network interface 110, a remote controller 111, a storage device 112, and a management unit 113. The existing network storage 103 may be a dedicated apparatus or may be constructed by mounting the remote controller 111 on a general server, workstation or PC having a storage device. The network interface 110 is an interface for communicating between the clients 100 and 101 and the existing network storage 103.

The remote controller 111 processes requests such as a mount procedure, a file creation request, a read request, a write request, a directory generation/deletion request, and the like issued from the clients 100 and 101 connected to the network 102. The "mount" means a process for making a file system in a network storage accessed via a network as a part of a file system of a client computer. As a result of the mount process, the client can access storage devices distributed on the network as if they are local file systems of the client. The remote controller 111 communicates with the clients 100 and 101 by using a standard file access protocol such as NFS or CIFS. For example., in the case of using the NFS protocol, known "mountd" and "nfsd" are used.

Each of the clients 100 and 101 issues a file access request to the storage device by using a file handle. The file handle is an identifier of a file object and is assured to be uniform to all of the files. The file object denotes either a file or a directory.

Figure 2:
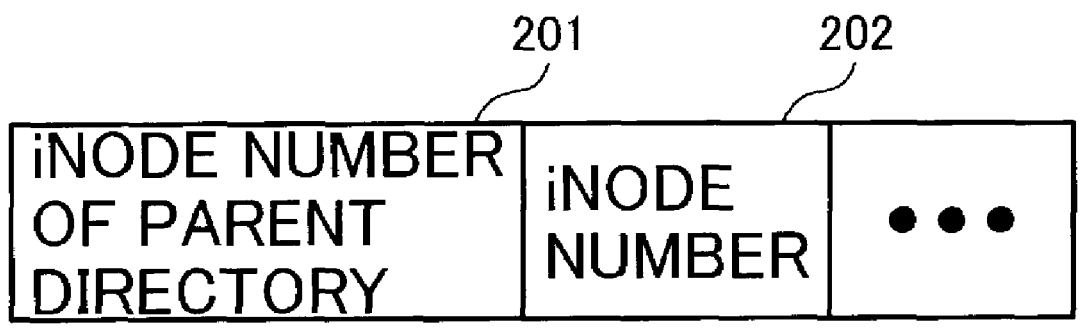
FIG. 2 is a diagram showing the configuration of a file handle 200 in the embodiment.

FIG. 2 shows the configuration of the file handle. A file handle 200 includes an i-node number field 201 of a parent directory and an i-node number field 202 of a file object.

As examples of access requests for a file and a directory specified in the NFS protocol, for example, there are an LOOKUP procedure for obtaining a file handle by designating a file name, a CREATE procedure for creating a file, a READ procedure for reading out a file, a WRITE procedure for writing a file, a SETATTR procedure for setting attributes of a file, a GETATTR procedure for reading out the attributes of a file, a REMOVE procedure for deleting a file, a RENAME procedure for changing a file name, a MKDIR procedure for creating a directory, a READDIR procedure for reading out a directory, and an RMDIR procedure for deleting a directory.

The remote controller 111 receives a file access request from a client with a file handle, as an argument, obtained as a result of execution of a mount procedure and a LOOKUP procedure, and transmits the results of processing of the requests to the client. In the case of using a CIFS protocol, known "Samba" or the like can be used. In the embodiment, it is assumed that each client accesses the existing network storage 103 by using the NFS protocol. In the storage device 112, a file system is mounted.

Figure 3:
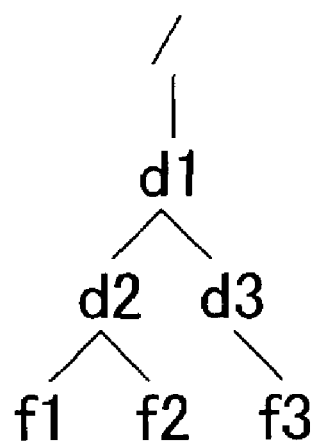
FIG. 3 is a diagram showing a basic structure of a file system in the embodiment.

FIG. 3 shows a basic structure of a file system in an UNIX operating system. The UNIX operating system takes, for example, the forms of Solaris of Sun Microsystems, AIX of International Business Machines Corporation, HP-UX of Hewlett-Packard Company, Linux, Free BSD, and the like.

In FIG. 3, a sign "/" and d1, d2, and d3 indicate directories, and f1, f2 and f3 denote files. The sign "/" is called a root directory and shows the start point of a hierarchical directory.

The management unit 113 manages basic setup information of the existing network storage 103. At the time of execution of a file access operation, the management unit 113 calls the remote controller 111 and processes a request. The basic setup information includes an IP address, name information, a mount point, and the like. The name information includes a host name and an NetBIOS name. The other setup information includes time, a user account, and the like. As examples of the file access operation performed through the management unit 113, there are creation of a new shared directory and a change in permission of a directory.

The administrator accesses the management unit 113 by using a general Web browser on the clients 100 and 101 as a user interface. The management unit 113 may be accessed by using a dedicated user interface program mounted on the client or a console connected to the existing network storage 103. On the management unit 113, a Web server is mounted so that the client can use a Web browser and the like. As the Web server, a known Apache or the like can be used.

The new network storage 104 includes a network interface 120, a remote controller 121, a storage device 122, and a virtualizing system 123. The new network storage 104 may be a dedicated apparatus or may be obtained by mounting the remote controller 121 and the virtualizing system 123 on a general server, work station, or PC having a storage device. Since the configurations of the network interface 120, remote controller 121, and storage device 122 are the same as those of the existing network storage 103 described above, their description will not be repeated here.

The virtualizing system 123 virtualizes the existing network storage 103 and the new network storage 104 so that the clients 100 and 101 virtually can sense the two network storages as a single file system. The virtualizing system 123 is, concretely, a system for virtually presenting a single files-and-directories tree structure to the clients 100 and 101 and is a feature part of the invention.

The virtualizing system 123 is comprised of a management unit 130, a file access requests processing unit 131, a setup information read out unit 132, a files-and-directories tree copying unit 133, a setup information swapping unit 134, a member information registering unit 135, a file migration unit 136, a mapping unit 137, a host table 140, and a unified management directory 141.

The management unit 130 resides in the virtualizing system 123 and sets an IP address, name information, a mount point, and the like in accordance with a management request from the client. In the case of virtualizing a plurality of network storages, the management unit 130 rewrites the host table 140 and the unified management directory 141, calls the setup information read out unit 132, files-and-directories tree copying unit 133, setup information swapping unit 134, member information registering unit 135, file migration unit 136, and mapping unit 137, and processes a request.

The administrator accesses the management unit 130 by using the general Web browser on the clients 100 and 101 as a user interface. In place of the general Web browser, a dedicated user interface program mounted on the client or a console connected to the new network storage 104 may be used. The management unit 130 may be provided with a Web server function or the like so that the client can access the management unit 130 by using a Web browser or the like. As the Web server, the known Apache or the like is used.

In the embodiment, the management unit 130 performs not only virtualization of a plurality of network storages but also setups of basic information such as an IP address, name information, mount point, and the like of a network storage. It is also possible to employ a system configuration in which a management unit for virtualization and a management unit for setting basic information are separately provided.

The file access request processing unit 131 processes a mount procedure and a file access request from the clients 100 and 101. In the embodiment, the client 100 accesses the file access request processing unit 131 by using the above-described NFS protocol. It is assumed that a file access is performed by using the NFS protocol among file systems of the virtualizing system 123, existing network storage 103, and new network storage 104.

When the client is a CIFS client, the client accesses the file access request processing unit 131 by using the CIFS protocol. In this case, the NFS protocol is used for a file access executed among the file access request processing unit 131 in the virtualizing system 123 and the storage devices of the existing network storage 103 and the new network storage 104. Since a file access according to the CIFS protocol can be realized by using a known technique such as Samba, it is not described in detail here.

For example, by installing Samba in the virtualizing system 123, mounting "export point" to an NFS client for a CIFS client, and starting SMB service, a file sharing service can be provided to the CIFS client without changing Samba. The file access request process performed by the file access request processing unit 131 will be described later.

The setup information read out unit 132 reads out basic setup information such as IP address, name information, and mount point from the existing network storage 103. Reading out of the setup information can be realized by accessing the management unit 113 in the existing network storage 103. When basic setup information of the existing network storage 103 exists as a file, reading out of the setup information can be also realized by reading out the file. When basic setup information is written in a specific area in the existing network storage 103, reading out of the setup information can be also realized by reading the area.

The files-and-directories tree copying unit 133 accesses the storage device 112 in the existing network storage 103 to retrieve a directories tree structure and a file structure below the mount point read out by the setup information read out unit 132 and copies the files-and-directories tree structure to the unified management directory 141 in the virtualizing system 123.

The setup information swapping unit 134 sets the IP address and name information which is set in the management unit 130 in the new network storage 104 to the management unit 113 in the existing network storage 103. The setup information swapping unit 134 sets the IP address and name information read out from the existing network storage 103 by the setup information read out unit 132 into the management unit 130 in the new network storage 104. As described above, by swapping basic setup information, the existing network storage 103 is replaced with the new network storage 104.

By storing the IP address and name information of the existing network storage 103 into the new network storage 104 and storing the IP address and name information of the new network storage 104 into the existing network storage 103, it becomes possible to make each of the clients virtually sense that the capacity of the existing network storage 103 has been expanded without changing settings in the clients 100 and 101.

The member information registering unit 135 is started by the management unit 130. When a member registration request from the management unit 130 is received, the member information registering unit 135 registers into the host table 140, as member information, identification information of a network storage to become a member of the virtualizing system 123, that is, identification information of a network storage to be virtually shown as a single network storage. When a plurality of directories tree structures exist in the unified management directory 141, the directories tree structure of the unified management directory 141 is copied into the storage device of the new member. When a member delete request is received from the management unit 130, the member information registering unit 135 deletes the member information from the host table 140.

The file migration unit 136 is invoked by the management unit 130. The file migration unit 136 migrates a file in order to replace the existing network storage 103 with the new network storage 104 when the existing network storage 103 becomes old or unstable. When free space of the storage device 112 in the existing network storage 103 becomes small, the file migration unit 136 moves files from the existing network storage 103 to the new network storage 104. Further, in the case such that unbalance occurs between free space in the existing network storage 103 and free space in the new network storage 104, the file migration unit 136 moves a file from a network storage of smaller free space to a network storage of larger free space.

The file move operation by the file migration unit 136 may be performed in the background so as not to exert an influence on a file access from a client to a network storage or may be performed concentratedly while temporarily stopping a file access from a client.

The host table 140 manages member information of the virtualizing system 123. When name information is swapped by the setup information swapping unit 134, name information of the network storage held in the host table 140 is also replaced. FIG. 4 shows outline of the host table 140.

The host table 140 shows a corresponding relation between name information of a network storage as a member of the virtualizing system 123 and a network storage identifier which is unified among members. Line 401 indicates name information indicative of the name of a storage device included in a network storage as a member, line 402 a mount point of each storage device, and line 403 an identifier of each storage device. In the case where a plurality of storage devices exist in one network storage, identification information corresponding to each of the storage devices is registered in the host table 140. In FIG. 4, for simplification, a network storage identifier (identifier of a storage device) of the existing network storage 103 is set as PS1, and a network storage identifier of the new network storage 104 is set as PS2.

The unified management directory 141 manages a files-and-directories tree structure of a whole system including the existing network storage 103 and the new network storage 104, and all of file identifiers (attribute information). Although the files-and-directories tree structure of the unified management directory 141 are viewed from the client, each file on the unified management directory 141 does not have data as the entity of each file. All of data as the entity of a file is distributed to the existing network storage and to the new network storage.

In the embodiment, a file system is used as the unified management directory 141 for virtually presenting a single files-and-directories tree structure to the client. A general file system performs a process of storing a directories tree structure and a file identifier of a file and also data as the entity of the file. The virtualizing system 123 makes the file system of the unified management directory 141 create a dummy file. The dummy file does not have data as the entity of the file.

When the client issues a file creation request (CREATE procedure in the NFS protocol) to the virtualizing system 123, the file access requests processing unit 131 creates a file structure for the unified management directory 141. In this case, the entity of the file is stored in the file system of either the existing network storage or new network storage.

When the client 100 issues the READ procedure to the file access requests processing unit 131 in the virtualizing system 123, the file access requests processing unit 131 accesses the unified management directory 141 to specify a dummy file and, by using the dummy file, determines the network storage in which the entity of the file is stored. The file access requests processing unit 131 reads out data as the entity of the file from the network storage and transmits the read data together with attribute information managed by the unified management directory 141 to the client. As long as the directories tree structure and the file identifier can be managed, the unified management directory 141 does not always have to use the file system. If it is assured that the file identifier is uniform to all of the files, the unified management directory 141 may use a database or a dedicated table.

The mapping unit 137 associates a file with a network storage to which the file is stored. In the embodiment, the mapping unit 137 stores the identifier of a network storage for storing the entity of a file into the dummy file created in the unified management directory 141.

The identifier of the network storage is a unified value in the system and registered in the host table 140, and the network storage identifier to be written in a dummy file is determined so that files are distributed equally to the network storages. Concretely, When a file is newly created by a CREATE procedure, the identifier of the network storage in which the file entity is stored is determined by, for example, the round robin algorithm. As another method, it is also possible to monitor the stored data capacity of each of the network storages and determine the network storage so that the capacities of stored data become equal to each other. Alternately, all of files below a specific directory may be assigned to the same network storage.

In the embodiment, the unified management directory 141 stores the identifier of a network storage in which the file entity is stored into the dummy file. Alternately, the unified management directory 141 may have, in addition to the dummy file, a list for associating the name of a file held by each directory and the identifier of a network storage holding the file entity. As long as the network storage in which the file entity of each file is located can be unconditionally determined from the file identifier, management information of the unified management directory 141 may be managed by a dedicated table or any other method may be employed.

A copy process of files-and-directories tree (501) performed by the files-and-directories tree copying unit 133 will now be described in detail with reference to FIG. 5.

The management unit 130 reads out a mount point from the existing network storage 103 by the setup information read out unit 132, calls the files-and-directories tree copying unit 133, and executes the files-and-directories tree copying process (501). In the first process (step) 502, a check is made to see whether an unsearched file object F exists on the existing network storage 103 or not. If YES, whether the file object F is a directory or not is determined in process 504.

In the case where the file object F is a directory, process 505 is performed. In the process 505, a directory F is generated in the unified management directory 141. In the case of using the NFS protocol, an MKDIR procedure using name F of the directory and a file handle H of a parent directory as arguments is issued to the unified management directory 141. When a response to the MKDIR procedure is received from the unified management directory 141, the process of generating the directory F is finished, and the program sequence returns to the process 502.

When it is found that another unsearched file object F exists in the process 502, process 504 is performed. In the case where the file object F is a file, by searching the host table 140 shown in FIG. 4, the identifier PS of the existing network storage 103 is obtained in process 506. From the host table 140, for example, the identifier PS1 of the existing network storage 103 is retrieved. In this case, since a target file exists only in the existing network storage 103, the identifier PS1 is not changed. Consequently, the identifier PS1 may be obtained in the process 506 for the first time only and stored in a memory, thereby to use the stored value thereafter. A dummy file F having the identifier PS (=PS1) of the existing network storage 103 obtained in the process 506 as data is generated In process 507 in the unified management directory 141. Generation of the dummy file F can be realized by using a CREATE procedure and a WRITE procedure. After generating the dummy file F, the program sequence returns to the process 502, and the above-described processes are repeated. When there is no unsearched file object F in the process 502, the files-and-directories tree copying process is completed (process 503).

Figure 6:
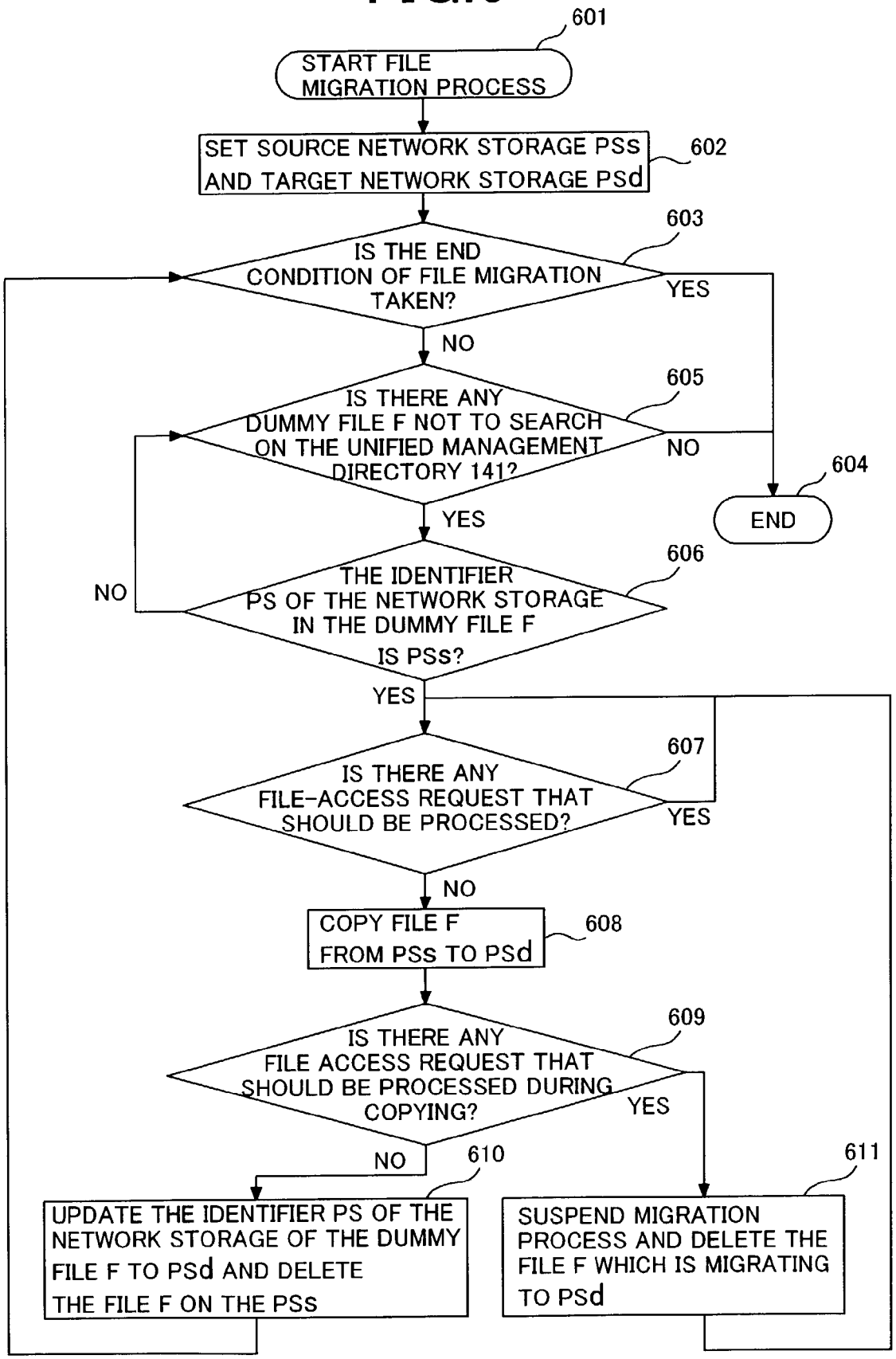
FIG. 6 is a diagram showing the flow of a file migration process in the embodiment.

FIG. 6 shows the details of the flow of a file migration process performed by the file migration unit 136.

The file migration unit 136 is started by the management unit 130 in the case where the free space of the existing network storage 103 becomes below a threshold or in the case where the existing network storage 103 is replaced with the new network storage 104.

In a file migration process 601, in the first process 602, a source network storage PSs and a target network storage PSd are determined. In the next process 603, whether an end condition of finishing the file migration process is satisfied or not is determined. For example, when the file migration unit 136 is started by the management unit 130 in accordance with a result of monitoring the free space, if the free space of PSs becomes larger than the threshold in the file migration process, the migration process is finished. When the management unit 130 starts the file migration unit 136 in response to a request of replacing the existing network storage 103 with the new network storage 104, the end condition of the file migration process is migration of all of files existing in PSs to PSd. The file migration process in process 605 and subsequent processes is continued until the end condition is satisfied in the process 603.

In process 605, a check is made to see whether an unsearched dummy file F exists in the unified management directory 141 or not. In step 606, whether the identifier PS of the network storage held in the dummy file F is the source network storage PSs or not is determined. When PS and PSs match each other, that is, when the entity of the file F exists in PSs, process 607 is performed. In the process 607, a check is made to see whether there is a file access request being processed or to be processed in the file access requests processing unit 131. If there is no file access requests process of copying the entity of the file F from PSs to PSd is started in process 608.

In the copy process in the process 608, a READ procedure is issued by using, as an argument, a file handle Hpss obtained by issuing a LOOKUP procedure to the source network storage PSs. After that, a CREATE procedure of the file F is issued to PSd as a destination to create the file F, and data as a return value of the READ procedure to PSs is written to the file F by a WRITE procedure.

In the NFS protocol, read/write of a file having a predetermined size or larger is realized by issuing a plurality of READ procedures and a plurality of WRITE procedures. For example, 8192 bytes data is transferred by each READ/WRITE procedure. In the embodiment, in order to prevent a file access request from a client from being stopped as much as possible, the process 609 is executed for each READ/WRITE procedure to check whether there is a file access request to be processed or not. If there is a file access request to be processed, process 611 is performed.

In the process 611, the file F being copied in PSd is discarded. Discard of the file F is performed by issuing a REMOVE procedure to PSd. On receipt of a response to the REMOVE procedure, the program sequence returns to the process 607 and waits until there is no file access request to be processed. When there is no file access request to be processed, the file migration process is restarted and the file F is moved again from PSs to PSd. After finishing the copy process of the file F, process 610 is executed.

In the process 610, after completing the copy process of the file F, the identifier PS of the network storage held in the dummy file F of the unified management directory 141 is changed from PSs to PSd, and the file F is deleted from PSs. Deletion of the file F is realized by issuing the REMOVE procedure to PSs. After that, the program sequence returns to the process 603 and continues the above processing.

Figure 7:
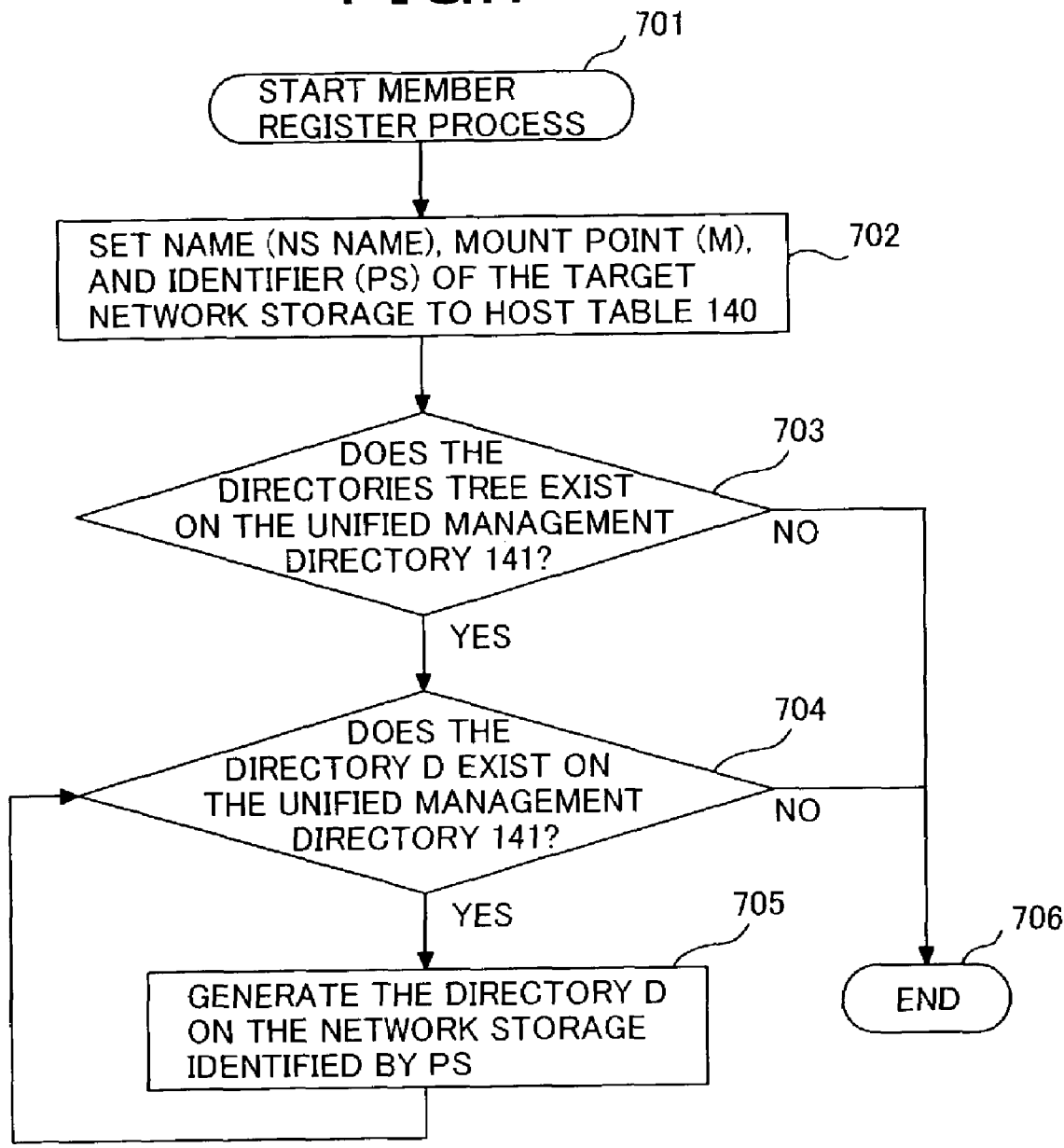
FIG. 7 is a diagram showing the flow of a member register process in the embodiment.

FIG. 7 shows the flow of member register process performed by using the member information registering unit 135.

When the management unit 130 starts the member information registering unit 135 in response to the expansion request from the client, a member register process 701 is started. A member register request from the management unit 130 is issued by using, as arguments, name information of the network storage having the storage device to which a member is registered and the mount point of the file system of the storage device.

In process 702, in response to the member register request from the management unit 130, name NSname of a target network storage to be registered and a mount point M are registered in the host table 140, and the identifier PS of the network storage is set.

In process 703, whether a directories tree structure exists on the unified management directory 141 or not is checked. If NO, the member register process is completed. If YES, in process 704, the unified management directory 141 is searched for a directories tree, and a check is made to see whether an unsearched directory D exists or not. When there is no unsearched directory D, the member register process is completed.

If an unsearched directory D is found in the directories tree in the unified management directory 141 in the process 704, a directory D is created in the storage device of the network storage identified by the identifier PS of the network storage in process 705. The directory D is generated by issuing an MKDIR procedure to the network storage having the identifier PS. After the generation, the program sequence returns to the process 704 and continues the above processing.

Although the flow of the member register process has been described with reference to FIG. 7, in a member delete process, it is sufficient to perform a process corresponding to the process 702 in the registering process. Concretely, information regarding the network storage corresponding to the member to be deleted is completely deleted from the host table 140.

A process of the file access request in the file access request processing unit 131 will now be described. The file access requests processing unit 131 accepts a file access request from a client to process the request only in the case where network storages are managed in a unified manner by the virtualizing system 123. In the embodiment, the NFS protocol is used.

Figure 8:
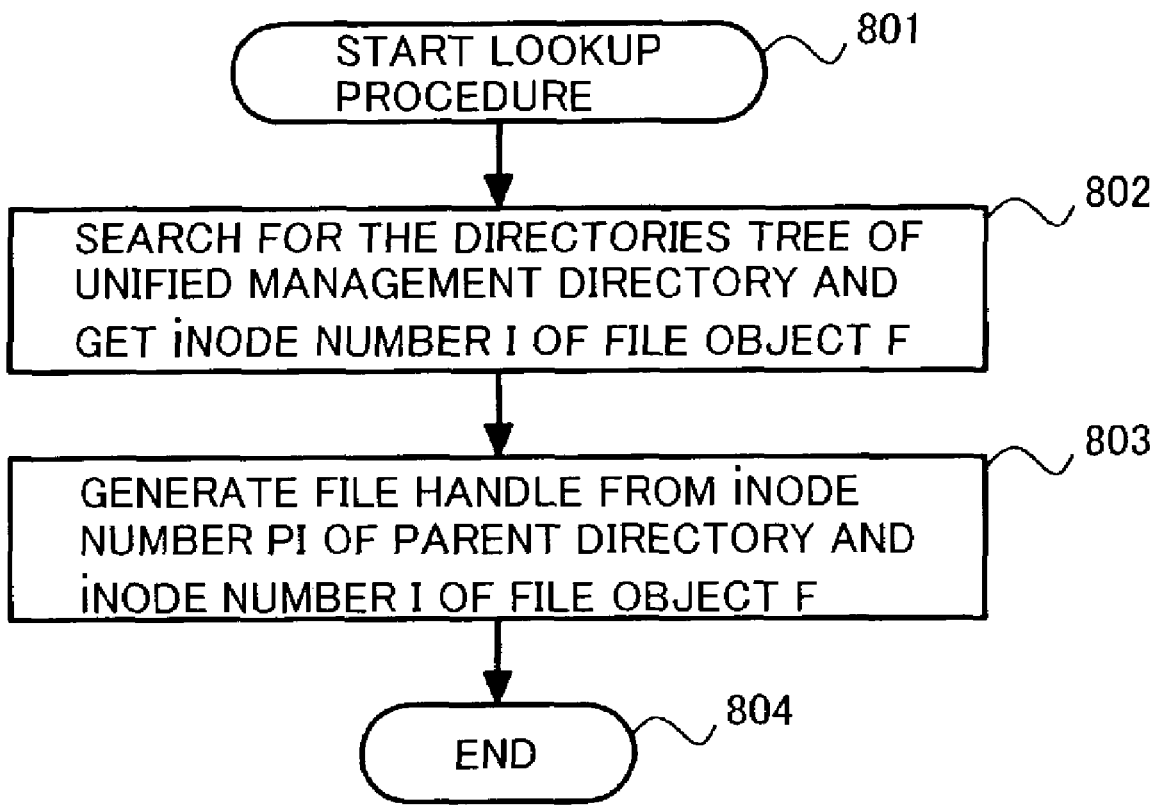
FIG. 8 is a diagram showing the flow of a LOOKUP procedure in a file access requests processing unit 131 in the embodiment.

FIG. 8 shows the flow of a LOOKUP procedure 801.

Arguments of the LOOKUP procedure are a file handle H of a parent directory of a file object and the name F of the file object. When the file access request processing unit 131 receives a LOOKUP procedure from the client 100, process 801 in FIG. 8 is called. In the first process 802, an i-node number PI held in the field 201 is taken out from the file handle H, and an i-node number I of a file object having the name F existing in the unified management directory 141 is obtained. In the next process 803, a file handle is constructed by the i-node number PI of the parent directory and the i-node number I of the file object F and the resultant file handle is returned to the client 100.

In the processing of the READDIR procedure, in a manner similar to the LOOKUP procedure, information of a target directory is read out and transmitted to the client 100.

Figure 9:
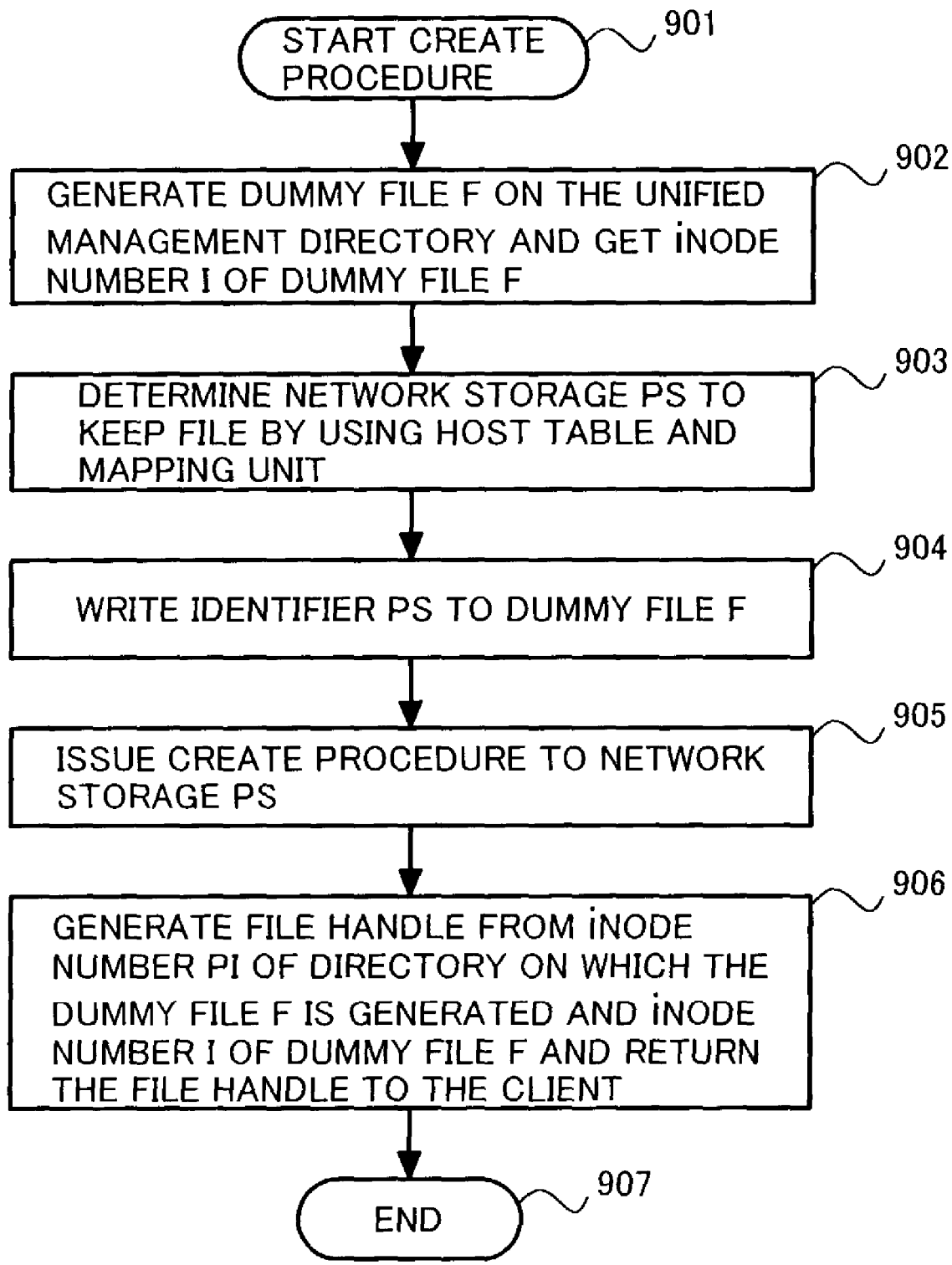
FIG. 9 is a diagram showing the flow of a CREATE procedure in the file access requests processing unit 131 in the embodiment.

FIG. 9 shows the flow of a CREATE procedure.

Arguments of a CREATE procedure are the file handle H of a directory in which a file is created and the name F of the file.

Upon receiving the CREATE procedure, the file access requests processing unit 131 calls a CREATE process 901. In the first process 902, the i-node number PI of the directory on which a file is created is taken out from the field 202 of the file handle H and a dummy file having a file name F is generated in the directory identified by the i-node number.

In the next process 903, by using the mapping unit 137 and the host table 140, the identifier PS of the network storage for storing a file requested by the CREATE procedure is determined. In process 904, the identifier PS is written in the dummy file F. The writing of PS is executed by using, for example, a WRITE procedure. In process 905, the CREATE procedure transmitted from the client is issued to the network storage PS. Upon receiving a response to the CREATE procedure from the network storage PS, in process 906, a file handle is constructed by the i-node number PI of the directory on which the dummy file F is generated and the i-node number I of the dummy file, and the file handle is returned to the client 100.

Figure 10:
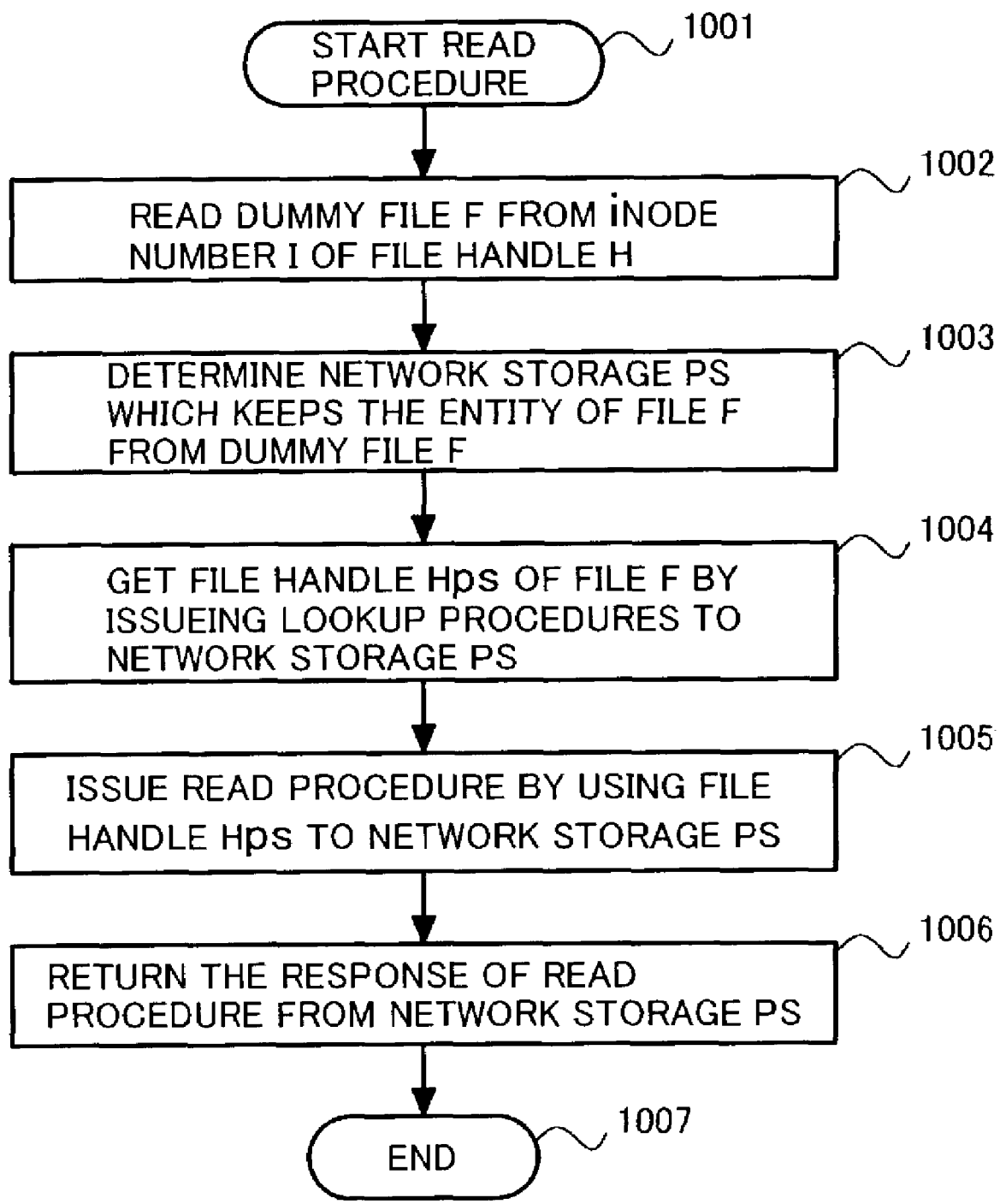
FIG. 10 is a diagram showing the flow of a READ procedure in the file access requests processing unit 131 in the embodiment.

FIG. 10 shows the flow of a READ procedure.

Arguments of the READ procedure are the file handle H of the file F to be read out and a file handle Hp of a parent directory of the file F to be read out. When the client 100 issues the READ procedure to the file access request processing unit 131, READ procedure 1001 is executed.

In the first process 1002, the dummy file F is read out from the file handle H, and, in the next process 1003, the network storage PS in which file entity is stored is obtained from the dummy file F. In the process 1004, a file handle Hps of the entity of the file F is obtained from the network storage PS. The file handle Hps can be obtained by issuing a LOOKUP procedure to the network storage PS. By storing the corresponding relation between the value of the file handle Hps obtained once and the file handle H into the unified management directory 141, at the time of issuing the READ procedure by using the file handle H next time, the file handle Hps in the network storage PS in which the file is stored can be obtained without issuing the LOOKUP procedure.

In process 1005, by using the file handle Hps obtained in the process 1003 as an argument, a READ procedure is issued to the network storage PS. When the network storage PS sends a result of the read out as a return value to the READ procedure, in process 1006, the read out result is transmitted to the client 100.

The "WRITE procedure" process is almost the same as the process for the READ procedure. In place of issuing the READ procedure to the network storage identified by the identifier PS in process 1005, the WRITE procedure is issued to the network storage PS. A RENAME procedure and a REMOVE procedure can be processed in a manner similar to the READ procedure.

FIG. 11 shows the flow of an MKDIR procedure.

Arguments of an MKDIR procedure are the name D of a directory to be generated and the file handle H of a parent directory to be generated. When the file access request processing unit 131 receives the MKDIR procedure from the client 100, an MKDIR procedure process 1101 is executed.

In the first process 1102, a directory having the name D is generated in the unified management directory 141 identified by the i-node number held in the field 202 of the file handle H. The i-node number of the generated directory is set as I. In the next process 1103, the MKDIR procedure is issued to all of network storages registered in the host table 140 to generate the directory having the name D. In the final process 1104, a file handle is generated from the i-node number PI of the parent directory of the directory D and the i-node number I of the directory D generated in the unified management directory 141, and the generated file handle is returned to the client 100.

The flow of an RMDIR procedure is similar to that of FIG. 11. It is sufficient to replace the MKDIR procedure with the RMDIR procedure. In a GETATTR procedure and a SETATTR procedure, when the file object to be accessed is a directory, a request is issued to each of the network storages to read out directory attributes and the directory attributes are set. In the case where the file object to be accessed is a file, in a manner similar to the READ procedure, it is sufficient to issue a request to a network storage in which a file is stored.

The flow of the general procedure in the embodiment will now be described.

As processes performed when the administrator purchased the new network storage 104, there are an expanding procedure for adding the new network storage 104 due to the shortage of capacity of the existing network storage 103, and a replacing process performed for replacing the existing network storage 103 which became old with the new network storage 104. First, the expanding procedure will be described.

As shown in FIG. 1, before additionally installing the new network storage 104, the clients 100 and 101 share the existing network storage 103. In the embodiment, it is assumed that the NFS protocol is used in a file access between the client and the existing network storage 103.

In the NFS protocol, first, the client issues a mount procedure to the existing network storage 103, and a root directory (called a mount point) of a shared file is mounted in a part of the file system of the client. The remote controller 111 of the existing network storage 103 responds to the mount procedure from the client by using known "mountd". The "mountd" returns the file handle of the mount point of the existing network storage 103 to the client. After that, the client accesses the file in the existing network storage 103 by using the file handle. It is assumed that an IP address xxxx and a name NSold are set in the management unit 113 of the existing network storage 103. The mount point is expressed by "/".

When free space in the existing network storage 103 becomes small, the management unit 113 of the existing network storage 103 notifies the administrator of necessity of adding a new network storage due to small free space by using, for example, an e-mail or the like. Since the free space monitoring method and notification method using an e-mail or the like are known, detailed description will not be given here. When the notification is received, the administrator adds the new network storage 104 as an expansion storage of the existing network storage 103.

FIG. 12 shows an expansion method of additionally installing a new network storage by the administrator.

The new network storage is additionally installed by performing, in order, connection to a power source and a network (step 1202), setup of the network storage (step 1203), identification of the network storage to be expanded (step 1204), start of the expansion process (step 1205), and end of the expansion process (step 1206).

In step 1202, the administrator connects a power source code of the new network storage 104 to a receptacle or the like and physically connects the new network storage 104 to the network 102. Steps 1203 to 1205 are performed to set input information from the administrator to the management unit 130 of the new network storage 104 by using a Web browser or the like on the client.

In step 1203, the administrator sets a temporary IP address and name information to the new network storage 104 via the Web browser or by using a dedicated user interface program. An IP address may be statically given by the client or may be dynamically given by using a DHCP server or the like. By setting basic setup information of the new network, communication with the existing network storage 103 is enabled. Since the network address setting method is known, its detailed description will not be given here. In the embodiment, yyyy and NSnew are given as a temporary IP address and a name given to the new network storage 104.

The processes in steps 1204 and 1205 will be described by using a user interface screen shown in FIGS. 13A and 13B.

Figure 13A:
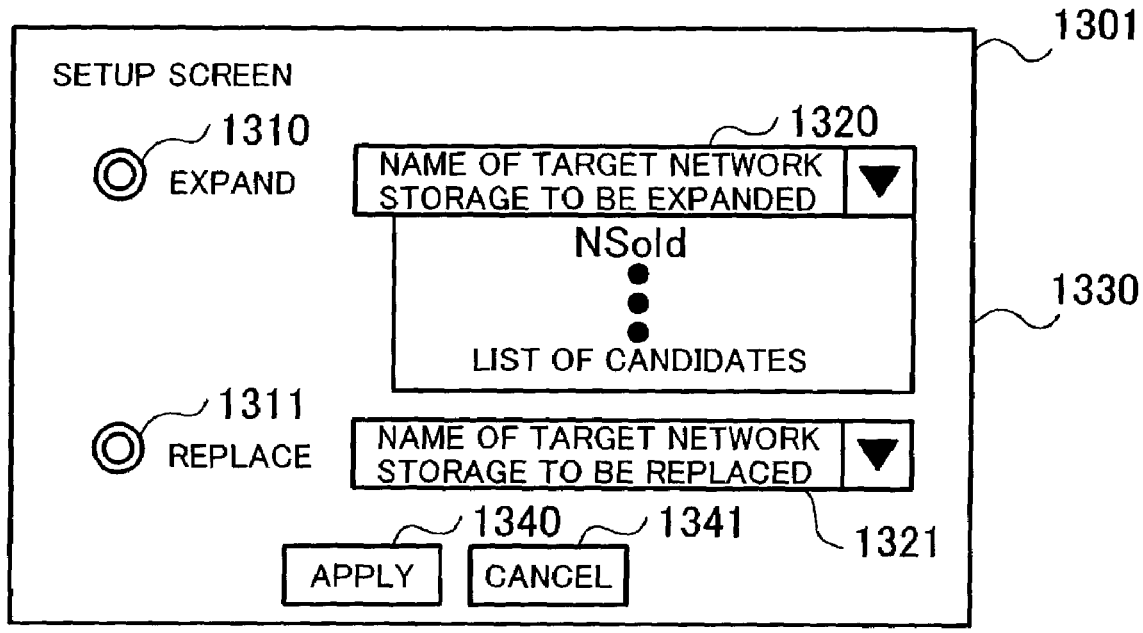
FIGS. 13A and 13B are diagrams showing user interface screens in the embodiment.
Figure 13B:
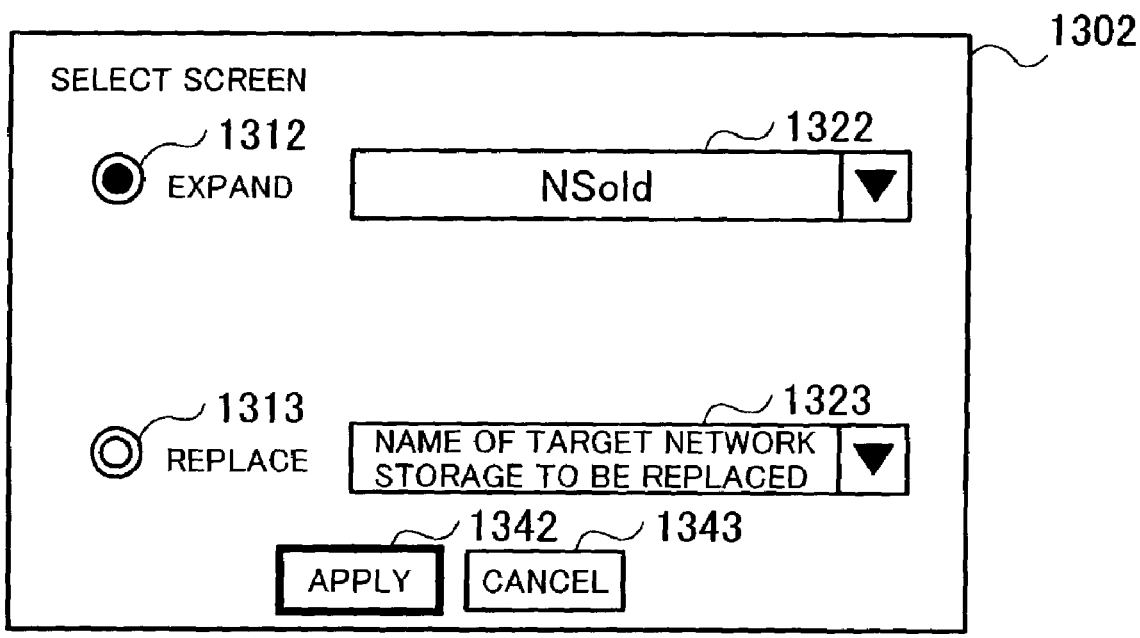

FIGS. 13A and 13B show user interface screens to execute steps 1204 and 1205, which are generated by the Web browser or the dedicated user interface program. FIG. 13A shows a user interface screen 1301 used when the administrator executes step 1204 and FIG. 13B shows a user interface screen 1302 used when the administrator executes step 1205.

On the user interface screen 1301, as an initial setup screen, check boxes 1310 and 1311 for selecting the expansion processing or replacement processing are displayed. In the initial setup screen, list boxes 1320 and 1321 for selecting a network storage to be expanded or replaced for each process are prepared. In a list box, a name list 1330 of network storages as candidates to be subjected to expansion or replacement is displayed. In the initial setup screen, an apply button 1340 for starting the expansion processing or replacement processing by using set information as arguments, and a cancel button 1341 for invalidating the setup information are prepared.

The network storage list 1330 is a name list of network storages existing on the network 102 and acceptable the expansion of memory capacity replacement. The name of a network storage to be displayed is obtained when the new network storage 104 transmits a broadcast request or the like to the network 102. Although a name list similar to the network storage list 1330 is displayed also in the list box 1321, it is not shown in the embodiment for simplification.

In the embodiment, it is assumed that the mount point as the root directory of the shared file of the existing network storage 103 is unconditionally determined by selecting name information of a network storage to be expanded or replaced from the network storage list 1330. More specifically, it is assumed that the mount point disclosed by the network storage to the administrator is determined in advance. In the case where the mount point cannot be unconditionally determined, for example, it is sufficient to separately prepare an input box for designation a mount point of the existing network storage 103 and allow the administrator to fill in the box.

In step 1204, the administrator selects an existing network storage desired to be expanded with the new network storage 104 by using the user interface screen shown in FIG. 13A. The administrator marks the checkbox 1310 and selects the name NSold of the existing network storage 103 from the network storage list 1330. The existing network storage 103 is designated by name information in the embodiment. The name information may be any of NetBOIS name, host name, and IP address. In step 1205, an expansion process start command is transmitted to the new network storage 104. The expansion process command uses, as an arguments the name of the existing network storage 103 which is set in the list box 1220 by the administrator.

FIG. 13B shows the user interface screen in step 1205. In FIG. 13B, elements in the user interface screen are the same as those in FIG. 13A. Since it is after execution of step 1204, the checkbox 1312 is marked and NSold is selected in the list box 1322. When the administrator clicks the apply button 1340 in this state, the expansion start command and name information (NSold in this case) of the network storage to be expanded are written in the management unit 130 in the virtualizing system 123 of the new network storage 103, and a message such that the expansion process or replacement process is being performed is displayed on the user interface screen.

By executing step 1205, the expansion command and the name NSold of the existing network storage 103 to be expanded are written into the management unit 130 in the virtualizing system 123 of the new network storage 104. The above writing can be realized by using a PUT command of an HTML protocol or the like. Alternately, a known technique using an interface adapted to Web can be also applied. When the writing is triggered from the client, the management unit 130 starts the expansion processing on the new network storage 104. The administrator waits until a message indicative of end of the processing is displayed on the user interface screen.

Figure 14:
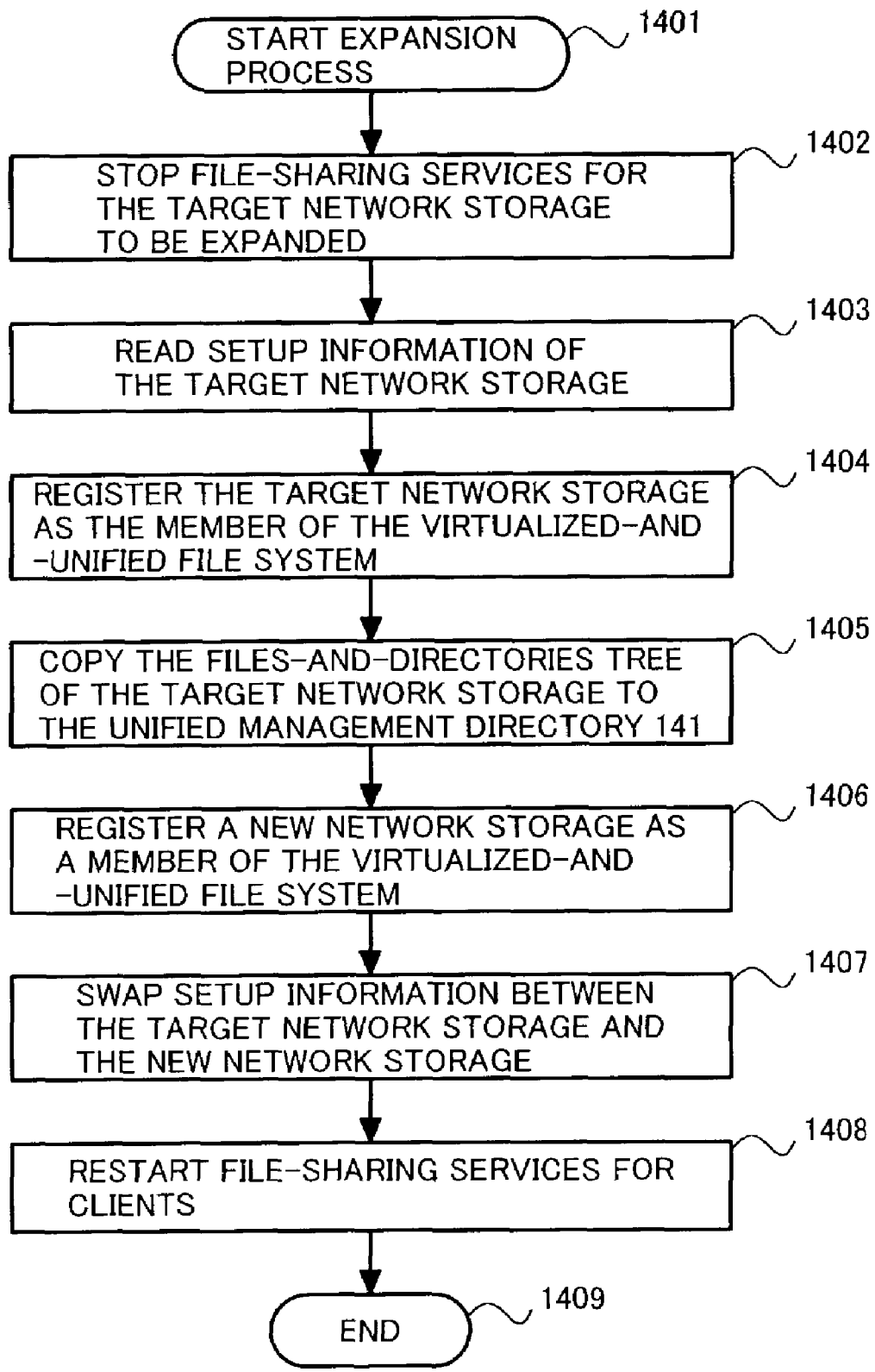
FIG. 14 is a diagram showing the flow of an expansion process in the embodiment.

FIG. 14 shows the flow of the expansion process executed by the new network storage 104. The expansion process 1401 performed by the new network storage 104 includes, in order, process of stopping file-sharing services of the network storage to be expanded (step 1402), process of reading out setup information of the network storage to be expanded (step 1403), process of registering the network storage 103 to be expanded as a member (step 1404) process of copying the files-and-directories tree of the network storage to be expanded (step 1405), process of registering the new network storage 104 as a member (step 1406), process of swapping the setup information (step 1407), and process of restarting the file-sharing services (step 1408). Here description will be made in a case where the administrator selects NSold indicating the existing network storage 103 as a network storage to be expanded.

In the first step 1402, the file-sharing services of the existing network storage 103 are stopped until the expansion process is finished. Concretely, the existing network storage 103 is accessed, and when the file-sharing services use the NFS protocol, disclosure of the mount point to the client is stopped. When the disclosure is temporarily stopped, for example, an exports file is changed. If the client uses a CIFS protocol, it is sufficient to stop the "Samba service" without changing the "exports" file. In the case where any of the above processes is not performed, the administrator may send a notification to the client by an e-mail or the like, so that the client does not to access the existing network storage 103.

In the next step 1403, the basic setup information of the existing network storage 103 is read out by using the setup information readout unit 132. Concretely, the management unit 113 in the existing network storage 103 is accessed to read out the IP address xxxx, name NSold, and mount point "/", and the read out information is stored in the management unit 130 in the new network storage 104.

In step 1404, setup information read out in step 1403 according to the member register process shown in FIG. 7 is registered into the host table 140 by the member information registering unit 135. The member information registering unit 135 registers the name information of the network storage to be expanded and the mount point transmitted from the management unit 130 to the member register unit 135 into the host table 140 in the process 702 in FIG. 7. In this example, the name NSold of the network storage 103 to be expanded and the mount point "/" are registered in the host table 140, and the identifier PS1 is obtained. In process 703, since there is no directories tree structure in the unified management directory 141, the member register processing by the member information registering unit 135 is completed, and the control sequence returns to the management unit 130.

In step 1405, the management unit 130 calls the files-and-directories tree copying unit 133 and copies the files-and-directories tree structure of the existing network storage 103 into the unified management directory 141 in the virtualizing system 123 of the new network storage 104.

The process of copying the files-and-directories tree from the existing network storage 103 to the new network storage 104 will be described in detail with reference to FIGS. 1 and 5.

In the files-and-directories tree copying process, the files-and-directories tree structure on the storage device 112 of the existing network storage 103 are copied to the unified management directory 141. First, by issuing a mount procedure, the file system of the storage device 112 in the existing network storage 103 is mounted, and the file handle of the root directory "/" is obtained.

In process 502, it is checked whether an unsearched file object exists in the file system of the storage device 112 or not. In process 504, by issuing the LOOKUP procedure, it is checked whether the unsearched file object is a directory or not. Since d1 denotes a directory here, process 505 is executed.

In process 505, the MKDIR procedure is issued by using, as arguments, the name d1 of the directory and attribute information of the directory d1 obtained as a result of the LOOKUP procedure process to the directory d1 of the existing network storage 103, and the directory d1 is created in the unified management directory 141. After the creation of the directory d1, the program sequence returns to process 502 to check whether an unsearched file object exists or not. If it is found that a file object d2 exists and the file object is a directory, attribute information of the directory d2 is read out from the existing network storage. In process 505, by issuing the MKDIR procedure using the name d2 of the directory and attribute information as arguments, the directory d2 is created in the unified management directory 141. A directory d3 can be similarly generated.

If the next unsearched file object is f1 in process 502, process 506 is executed. In process 506, the identifier of the existing network storage 103 is obtained by referring to the host table 140. In this example, the identifier of the existing network storage 103 is PS1. Accordingly in the next process 507, a dummy file f1 including the identifier PS1 as data is created in the unified management directory 141. Creation of the dummy file is realized by the CREATE procedure and the WRITE procedure. After the creation of the dummy file, the program sequence returns to process 502. In this example, the next unsearched file object is a file having name f2, so that the process 506 is executed again. When it is found from the result of referring to the host table 140 that the network storage identifier is PS1, the process 507 is executed and the dummy file f2 having the network storage identifier PS1 is created in the unified management directory 141. Similar processes are performed with respect to a file f3, and a dummy file f3 is created in the unified management directory 141.

As a result of the above processes, the files-and-directories tree structure which is the same as those of the existing network storage 103 are created in the unified management directory 141. Each of the files in the unified management directory 141 indicates the identifier PS1 of the existing network storage 103 which holds the file entity.

In step 1406, the storage device 122 of the new network storage 104 is registered as a member by using the member information registering unit 135. As shown in FIG. 7, in the member information registering process, the name information of the new network storage and the mount point are registered in the host table 140 in process 702. If it is found in process 703 that a directories tree exists in the unified management directory 141, the process 704 is executed. In the process 704, only the directories tree structure of the unified management directory 141 is copied into the storage device 122 of the new network storage 104. As a result of the copying, the directories tree structure of the unified management directory 141 is copied into the storage device 122 of the new network storage 104. Although description has been made in the case where the new network storage 104 has the storage device 122 in the embodiment, the step is not performed if the new network storage 104 does not have a storage device.

In step 1407, by the setup information swapping unit 134, the setup information of the existing network storage 103 and that of the new network storage 104 are swapped. First, IP address yyyy and name NSnew for the new network storage held by the management unit 130 in the new network storage 104 are set in the management unit 113 in the existing network storage 103. Subsequently, the IP address xxxx and the name NSold of the existing network storage 103 read out by the setup information read out unit 132 are set in the management unit 130. Simultaneously, the name of the host table 140 is replaced. On the premise of such network environment that the IP address of the other party of communication can be retrieved by a DNS server, setup information necessary for swapping is only the name information.

When the client uses the CIFS protocol, in some cases, a plurality of clients share a network storage only by using the name information. For example, in the case where the existing network storage 103 is assigned to the network drive of the client, the network storage is managed only by the name "NetBIOS" In such a case, only by exchanging the name NSold of the existing network storage 103 with the name NSnew of the new network storage 104 by the setup information swapping unit 134, the existing network storage 103 can be replaced with the new network storage 104 without changing the settings of the client.

When step 1407 is executed, the expansion process is completed, and a message indicative of completion of the processing is displayed on the user interface screen via the management unit 130. After completion of the process, the file-sharing services are restarted in step 1408. Concretely, by disclosing the root directory of the unified management directory 141 to the client, an operation of the file access from the client is enabled. After step 1408, all of file access operations from the client are performed via the file access request processing unit 131.

Immediately after completion of the expansion process, all of entities of files exist in the existing network storage 103. Consequently, when the client issues a file access request, the unified management directory 141 is accessed via the file access request processing unit 131 of the new network storage 104, and the storage device 112 of the existing network storage 103 is accessed. However, since the settings of the client are not changed, it looks to the client virtually that the capacity of the existing network storage 103 has been expanded.

Immediately after expansion, no file is stored in the storage device of the new network storage 104. In order to equalize free spaces among the network storages, files may be explicitly moved from the existing network storage 103 to the new network storage 104 by the file migration unit 136. The file migration process maybe performed individually so as not to disturb the file access process from the client. It is also possible to completely stop the file access from the client to move a plurality of files in a lump. Alternately, by changing the function of the mapping unit 137, a file newly created after the expansion process may be stored into the new network storage 104.

Next, the replacement process will now be described.

As shown in FIG. 1, first, the clients 100 and 101 share the existing network storage 103 having the name of NSold. In the replacement process as well, in a manner similar to the expansion process, it is assumed that the NFS protocol is used for a file access performed between the client and the existing network storage 103. When the-existing network storage 103 becomes old, the administrator purchases the new network storage 104 and replaces the existing network storage 103 with the new network storage 104.

Figure 15:
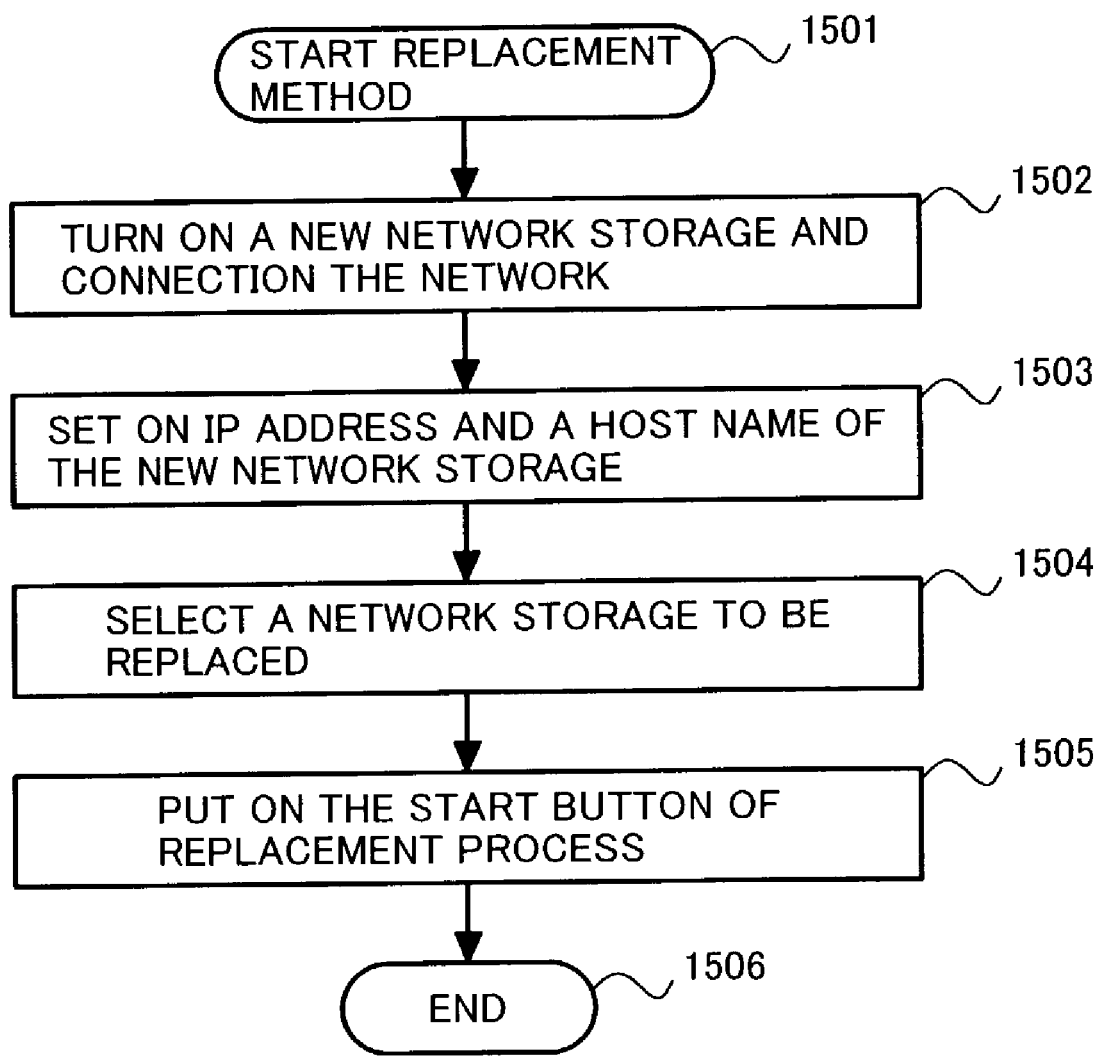
FIG. 15 is a diagram showing a network storage replacement method performed by the administrator in the embodiment.

FIG. 15 shows a replacement procedure 1501 with a new network storage by the administrator. Replacement of a network storage is performed by, in accordance with this order, connection to a power source and a network (step 1502), setting of network information (step 1503), designation of the network storage to be replaced (step 1504), start of replacing process (step 1505), and finishing of the replacing process (step 1506). Since the processes are similar to the expansion process shown in FIG. 12, the description will not be repeated here.

In the case of replacing the-network storage, the replacement processing buttons 1311 and 1313 are selected in the user interface screens 1301 and 1302 shown in FIGS. 13A and 13B. The administrator executes the steps 1502 to 1505, then the replacement process command and the name of the existing network storage to be replaced are written into the management unit 130 of the new network storage 104, and the management unit 130 in the virtualizing system 123 starts the replacement process.

The client (administrator) waits for a message indicative of restart of the file-sharing services displayed on the user interface screen. In the replacement process, all of files in the existing network storage 103 have to be moved to the new network storage 104. If the client waits until migration of all of files is completed, the file-sharing services are stopped for long time. Accordingly, in a state where the file migration by replacement is not completed, the file-sharing services to the client are restarted. On completion of the file migration, a message indicating that the replacement is completed and the network storage may be disconnected is displayed for the client.

Figure 16:
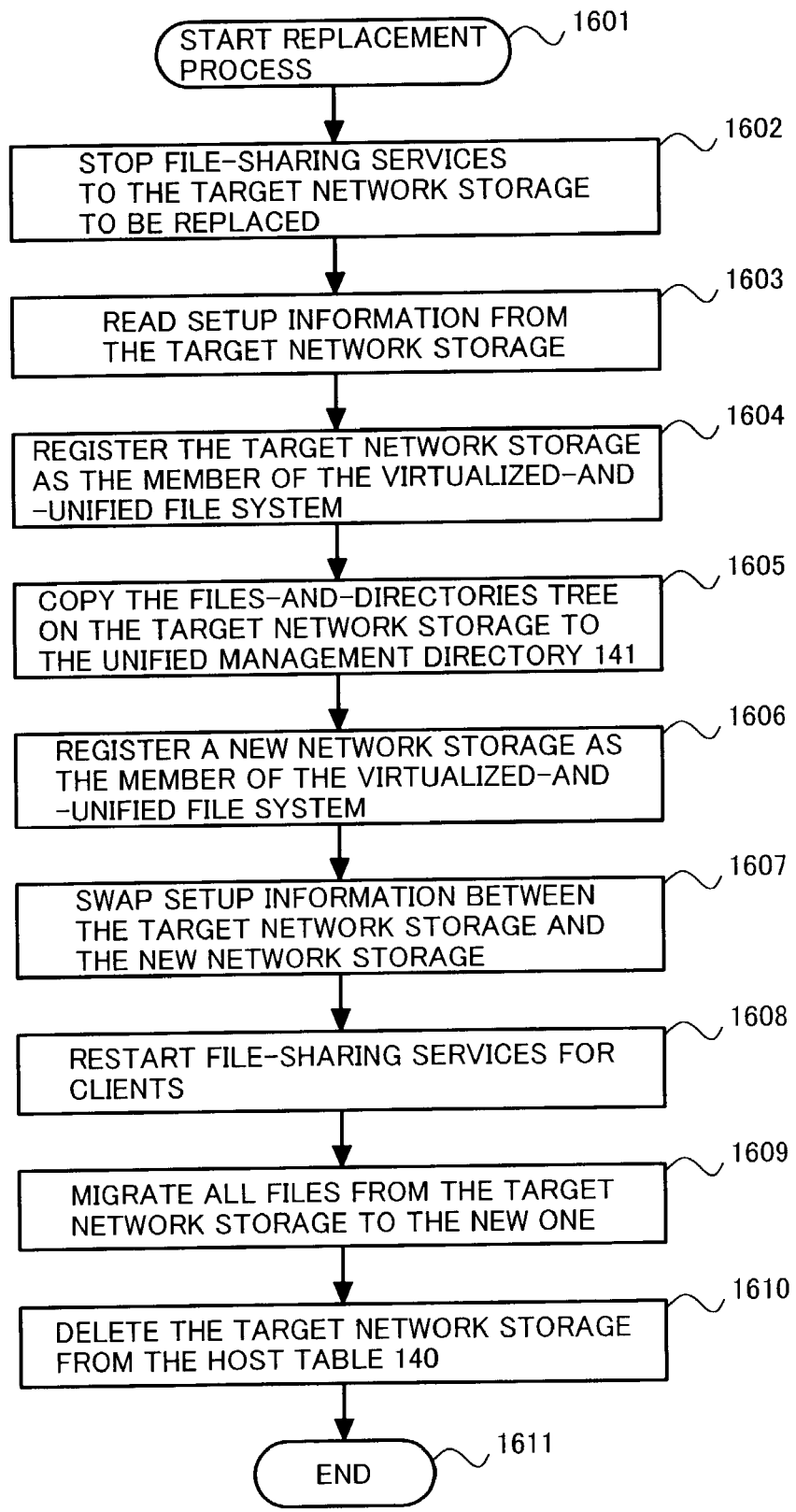
FIG. 16 is a diagram showing the flow of a replacement process in the embodiment.

FIG. 16 shows the flow of the replacement process executed by the new network storage 104. Replacement process 1601 executed by the new network storage 104 includes, in accordance with the order, stopping of the file-sharing services of the network storage to be replaced (step 1602), process of reading out setup information of the network storage (step 1603), process of registration to the host table 140 (step 1604), process of copying the directories tree structure of the network storage to be replaced (step 1605), process of registration to the host table 140 of the new network storage 104 (step 1606), process of swapping setup information (step 1607) restart of file-sharing services (step 1608), process of file migration (step 1609), and process of deleting the existing network storage 103 from the host table 140 (step 1610). It will be described about the case where the existing network storage 103 having the name Nsold is selected as a network storage to be replaced.

In the first step 1602, the file-sharing services of the existing network storage 103 are stopped until the process of step 1607 is finished. The method of stopping the file-sharing services is similar to that in the case of the expansion process Processes in steps 1603 to 1607 are similar to those in steps 1403 to 1407 in the expansion process shown in FIG. 14. After completion of the processes to step 1607, in step 1608, the file-sharing services are restarted and a message indicating that the client is permitted to access files is displayed. When the file-sharing services are restarted, the root directory of the unified management directory 141 is disclosed to the client.

In step 1609, files are migrated from the storage device 112 of the existing network storage 103 to the storage device 122 of the new network storage 104 by using the file migration unit 136. The file migration is performed so as not to disturb the file access from the client as shown in FIG. 6. The mapping method is changed so that the mapping unit 137 does not create a new file in the existing network storage 103.

After completion of the file migration process in step 1609, in step 1610, the existing network storage 103 is deleted from the host table 140. Since the setup information has been already replaced in step 1607, an object to be deleted is only the existing network storage 103 having the name of NSnew and the network storage identifier of PS1.

Differences from the expansion process are that the file migration process has to be completed before completion of the replacement process and that an entry of the existing network storage 103 is deleted from the host table 140 after completion of the file migration process. If it is desired to migrate a file after completely stopping a file access from the client, the process of step 1608 may be skipped.

The replacement process is completed by execution of step 1610 and a message indicative of completion of the process is displayed on the user interface screen via the management unit 130. Since no file access to the existing network storage 103 occurs after completion of the replacement process, unnecessary storages can be disconnected from the network.

2. The First Modification of the Embodiment

In the foregoing representative embodiment of the invention, in order to correlate the unified management directory 141 and each of network storages holding the entity of a file, the identifier of a network storage in which the file entity is stored is held in each dummy file. However, according to the managing method, in the case where a new network storage is additionally installed or in the case where the file migration process is performed due to replacement, the identifier of the network storage held in each dummy file has to be rewritten. Moreover, for each file access, it is required to open a dummy file to read out the identifier of the network storage. Accordingly, the larger the number of dummy files is, the larger the identifier writing overhead becomes.

In the first modification of the invention, therefore, a dummy file disposed in the unified management directory 141 is not provided with the network storage identifier. Instead, files are grouped, and the identifier of a network storage holding the file entity is determined on a file group unit basis.

Figure 17:
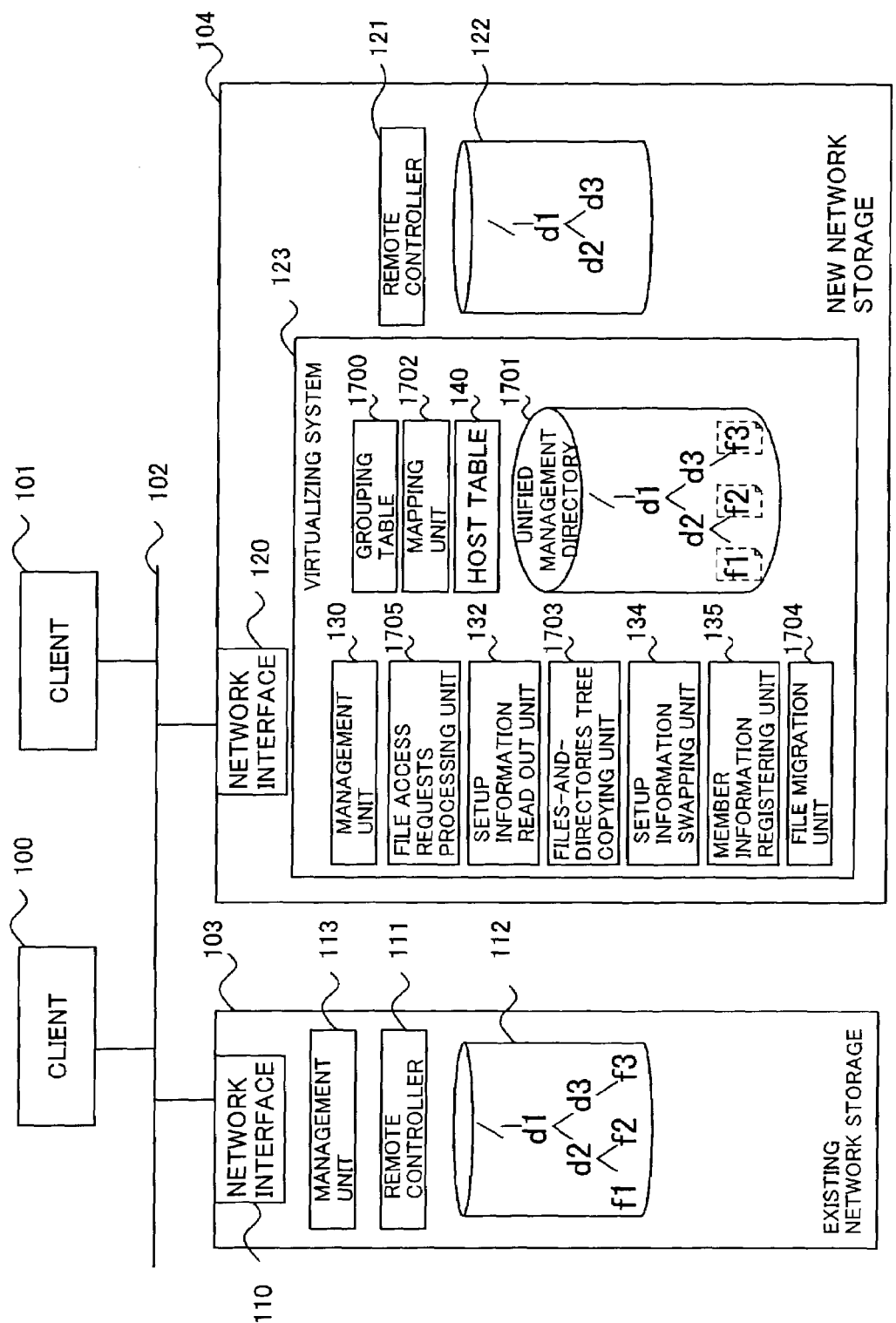
FIG. 17 is a diagram showing the configuration of a network storage system in a first modification of the invention.

FIG. 17 shows the configuration of a network storage system in the first modification.

In the first modification, the virtualizing system 123 of the new network storage 104 has a grouping table 1700. The structure of a dummy file of a unified management directory 1701, and processes of a mapping unit 1702, a directory tree copying unit 1703, a files-and-directories tree copying unit 1704 are slightly different from those of the foregoing representative embodiment. There is a change in the process of requesting an access to a file entity held by a network storage out of the file access requests processed by the file access request processing unit 1705, concretely, in a process of determining a network storage to store a file in each process of the CREATE procedure, READ procedure, WRITE procedure, RENAME procedure, and REMOVE procedure. In the SETATTR procedure and GETATTR procedure, when a file object to be accessed is a file, there is a change in the process of determining the network storage to which a file is stored.

FIG. 18 shows the structure of the grouping table 1700.

The grouping table 1700 indicates the corresponding relation between a file and a file group to which the file belongs. Concretely, i-node number I as a file identifier and an identifier G of a file group identified by the i-node number I are given. In the example shown here, line 1801 indicates identification numbers 0 to 3 of four file groups. Line 1802 indicates identifies of network storages in which a file belonging to each of file groups of the line 1801 is stored. A file belonging to the file group 0 is stored in the network storage having the identifier PS1 and a file belonging to the file group 3 is stored in a network storage having the identifier PF2. The corresponding relation between the identifier of a network storage and an actual network storage is known by referring to the host table 140. The grouping table 1700 is rewritten by the file migration unit 136 when a group to which a file belongs is moved.

In the unified management directory 1701, dummies of files held distributed in the network storages are disposed. In the first modification, however, the dummy files do not hold identification information of the network storage to which a file is stored.

The mapping unit 1702 gives correspondence between a file and a file group to which the file belongs. The corresponding relation is given by a hash function using, as a search key, the i-node number I which is an identifier of a dummy file managed by the unified management directory 141, and a hash value as a file group identifier. For example, in a hash function used for the case of dividing a plurality of files into N file groups, a value obtained by applying modulo computation of the number N of file groups (remainder of division with N) to the i-node number I becomes the identifier G of the file group. For example, when the number of file groups is 4, the file group identifier has any of values 0 to 3. The number N of file groups is unchanged irrespective of the configuration of network storage systems.

FIG. 19 shows the flow of copy process of a directories tree performed by the files-and-directories tree copying unit 1703 in the first modification.

Processes 1902, 1905, and 1906 correspond to the processes 502, 504, and 505 in FIG. 5, respectively. Different from the representative embodiment described in FIG. 5, in copy process 1901 of a directories tree in the first modification, after a directories tree structure of the existing network is copied into the unified management directory 141, group identifiers are set in line 1802 of the grouping map so that all groups correspond to the existing network storage 103 (1903). In the case where the file object F of the directories tree structure is a file, a dummy file with zero-byte-size is created on the unified management directory 141 (1907).

According to the first modification, in the file migration process performed by the file migration unit 1704, when the source network storage PSs and the destination network storage PSd are determined, one of groups belonging to the source network storage PSs shown in the grouping table 1700 is selected, and all of files belonging to the selected group are copied in a lump to the destination network storage PSd. Files belonging to the group G can be extracted by retrieving the directory tree of the unified management directory 1701. In the case of performing the migration process, by storing the name of the extracted file in a list or the like and managing a migration state of each of the files in the group G, files can be efficiently migrated.

3. The Second Modification of the Embodiment

In the representative embodiment, by additionally installing the new network storage 104, the process of expanding the capacity of the existing network storage 103 which is not virtually unified and the replacement process are realized. The second modification is different from the representative embodiment with respect to that the new network storage 104 is provided with means for determining whether the existing network storage 103 is virtualized or not.

Figure 20:
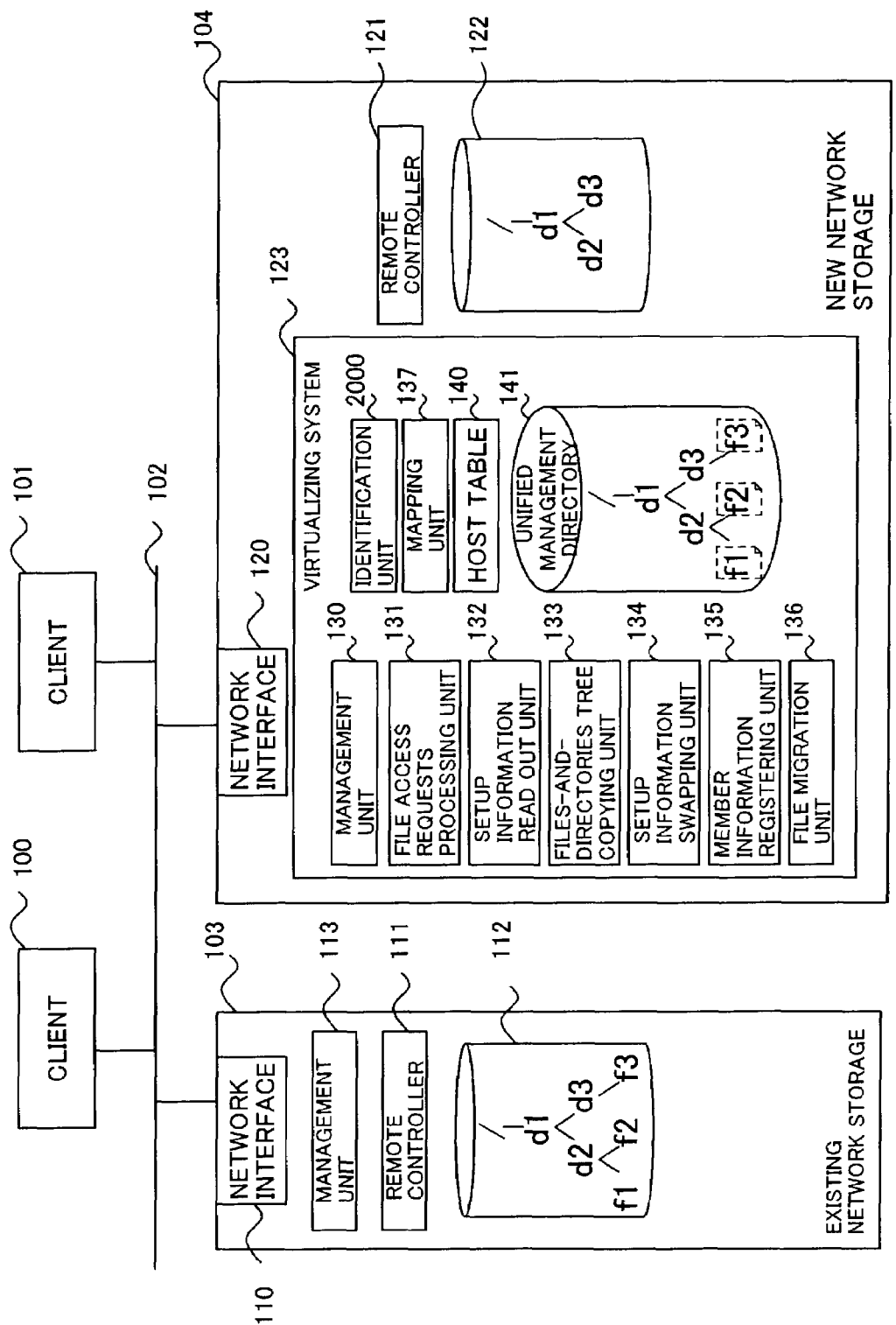
FIG. 20 is a diagram showing the configuration of a network storage system in a second modification of the invention.

FIG. 20 shows the configuration of a network storage system in the second modification.

The second modification is characterized by including an identification unit 2000. The identification unit 2000 is activated by the management unit 130, and accesses an additionally installed existing network storage 103 which is set in the management unit 130 by the client. After checking whether the network storage 103 is virtualized or has means for virtualization, the identification unit 2000 executes the expansion process or replacement process.

If the existing network storage 103 has not been virtualized, the management unit 130 in the new network storage 104 performs the expansion process. When the existing network storage 103 is provided with means for virtualization or is already virtualized, the management unit 130 of the new network storage 104 calls the management unit in the existing network storage 103. The called management unit performs the expansion process and sends the processing result to the management unit in the new network storage 104. The identification unit 2000 may be included in the management unit 130.

Figure 21:
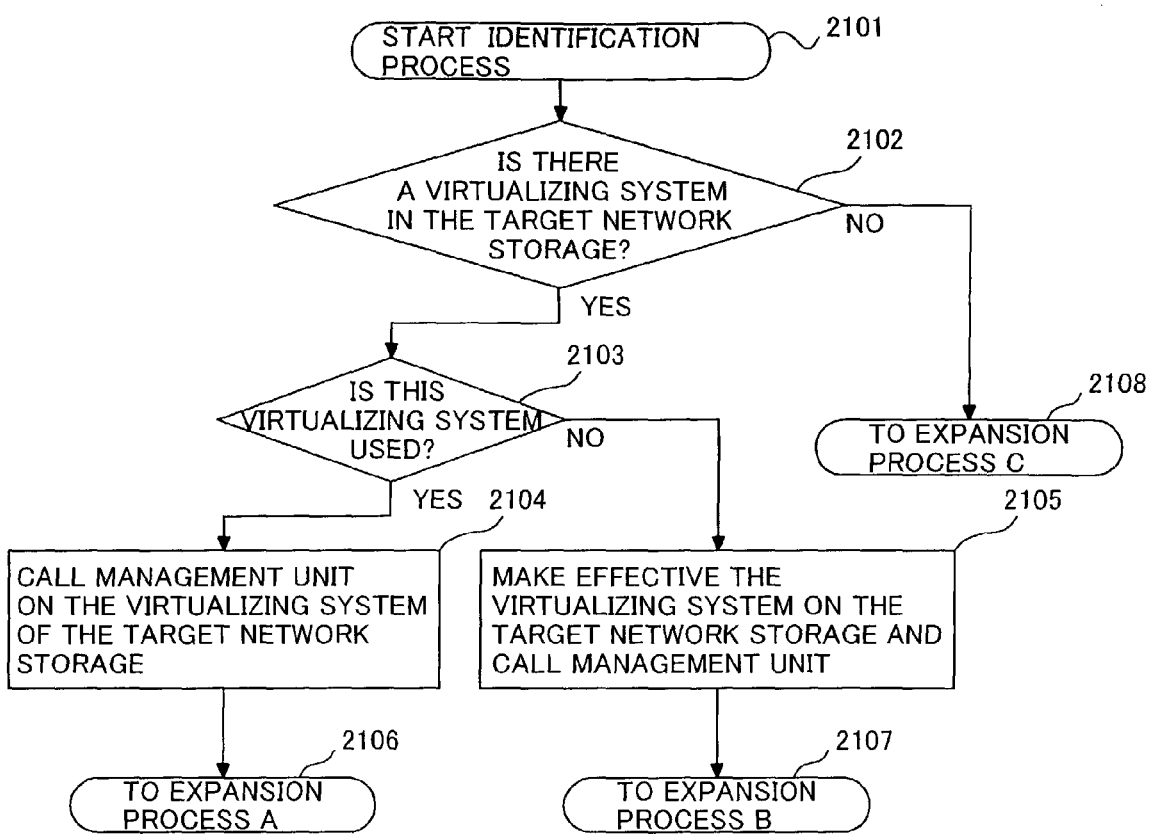
FIG. 21 is a diagram showing the flow of an identify process in the second modification.

FIG. 21 shows the flow of an identification process part in the expansion process.

In the expansion procedure shown in FIG. 12, upon setting an IP address, name information and the like, and, further, an expansion start command of the new network storage 104 and name information of the target network storage in the management unit 130 of the new network storage 104, the management unit 130 starts the expansion process and, first, calls the identification unit 2000.

In an identify process 2101 executed by the identification unit 2000, in the first process 2102, the management unit 113 of the existing network storage 103 to be expanded is accessed to check whether the virtualizing system exists or not. If the virtualizing system does not exist, an expansion process C is performed in process 2108.

In the expansion process C, in a manner similar to the expansion process described in the representative embodiment, the expansion process shown in FIG. 14 is performed by mainly the management unit 130 of the new network storage 104. The host table 140 and the unified management directory 141 for registering a member of the virtualizing system exist in the new network storage 104.

In the case where the virtualizing system exists in the network storage to be expanded in process 2102, in process 2103, whether the virtualizing system is being used or not is checked. The use state of the virtualizing system can be determined by checking whether the host table is set or not or whether the file access request processing unit is actuated or not. In the case where the virtualizing system is being used in the network storage to be expanded, in process 2104, the management unit of the virtualizing system in the network storage to be expanded is called, and the expansion process A (2106) is performed. If the virtualizing system is not being used, in process 2105, the virtualizing system in the network storage to be expanded is started, the management unit is called, and an expansion process B (2107) is performed.

The second modification is characterized in that, according to the identify process, the expansion processes A and B are performed by the management unit of the network storage to be expanded, and the expansion process C is performed by the management unit 130 of the new network storage 104.

Figure 24:
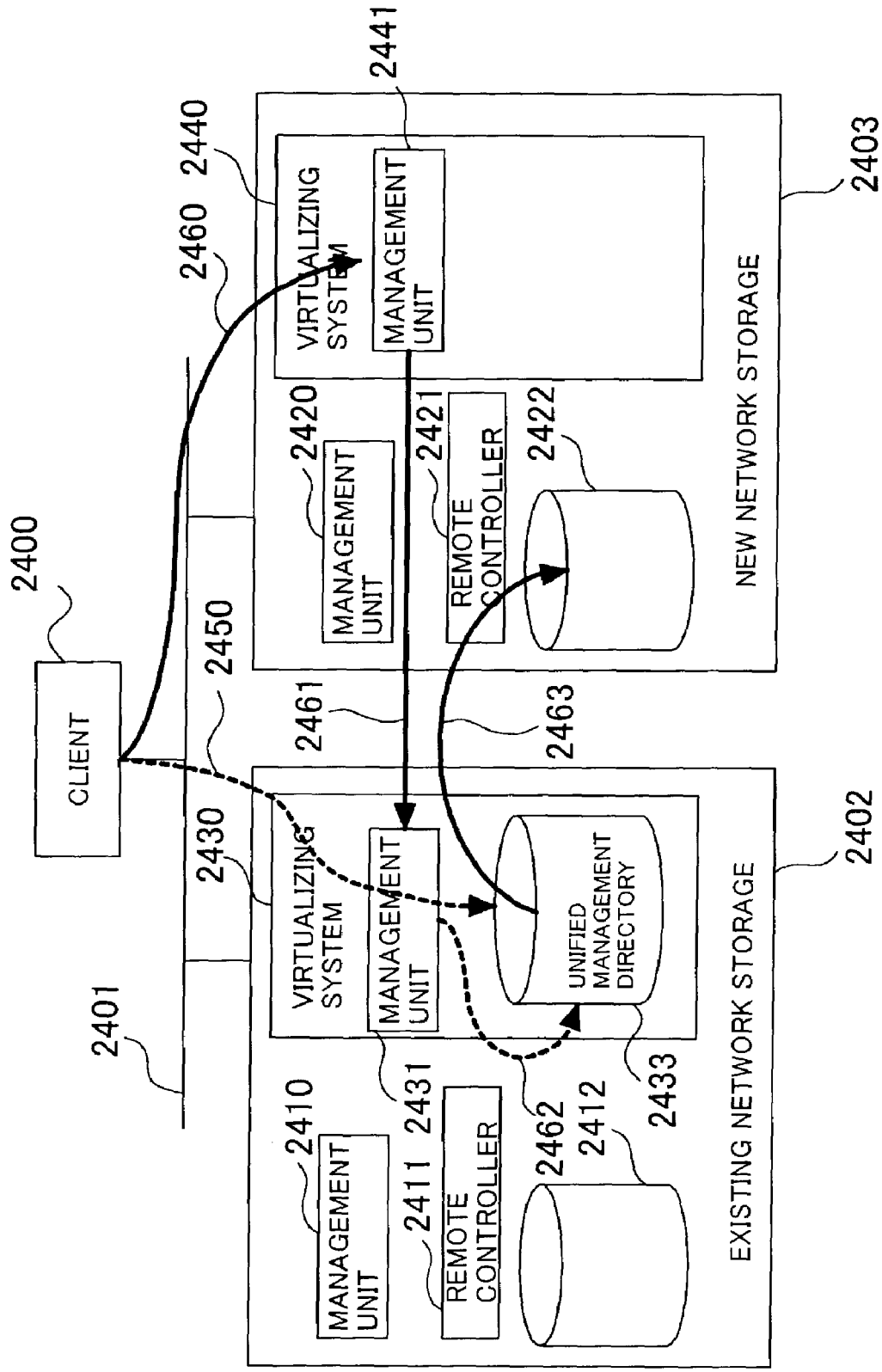
FIG. 24 is a diagram showing a schematic configuration of a network storage system as a target of the expansion process A in the second modification and outline of the expansion procedure.

FIG. 24 shows a schematic configuration of a network storage system as an object of the expansion process A and outline of the adding procedure.

An existing network storage 2402 and a new network storage 2403 have virtualizing systems 2430 and 2440, respectively. To make explanation simpler, in FIG. 24, only a management unit 2431 and a unified management directory 2433 are shown in the virtualizing system 2430, and only a management unit 2441 is shown in the virtualizing system 2440. In practice, however, the other elements shown in FIG. 1 are also included.

In the expansion process A, a client 2400 accesses a file via the virtualizing system 2430 (2450). In the expansion procedure, when the client issues an expansion request with name information of the existing network storage 2402 to be expanded as an argument to the management unit 2441 of the new network storage 2403 (2460), the management unit 2441 calls the management unit 2431 of the existing network storage 2402 (2461). The management unit 2431 accesses the unified management directory 2433 (2462) and a directories tree structure is copied from the unified management directory 2433 to a storage device 2422 (2462).

Figure 22:
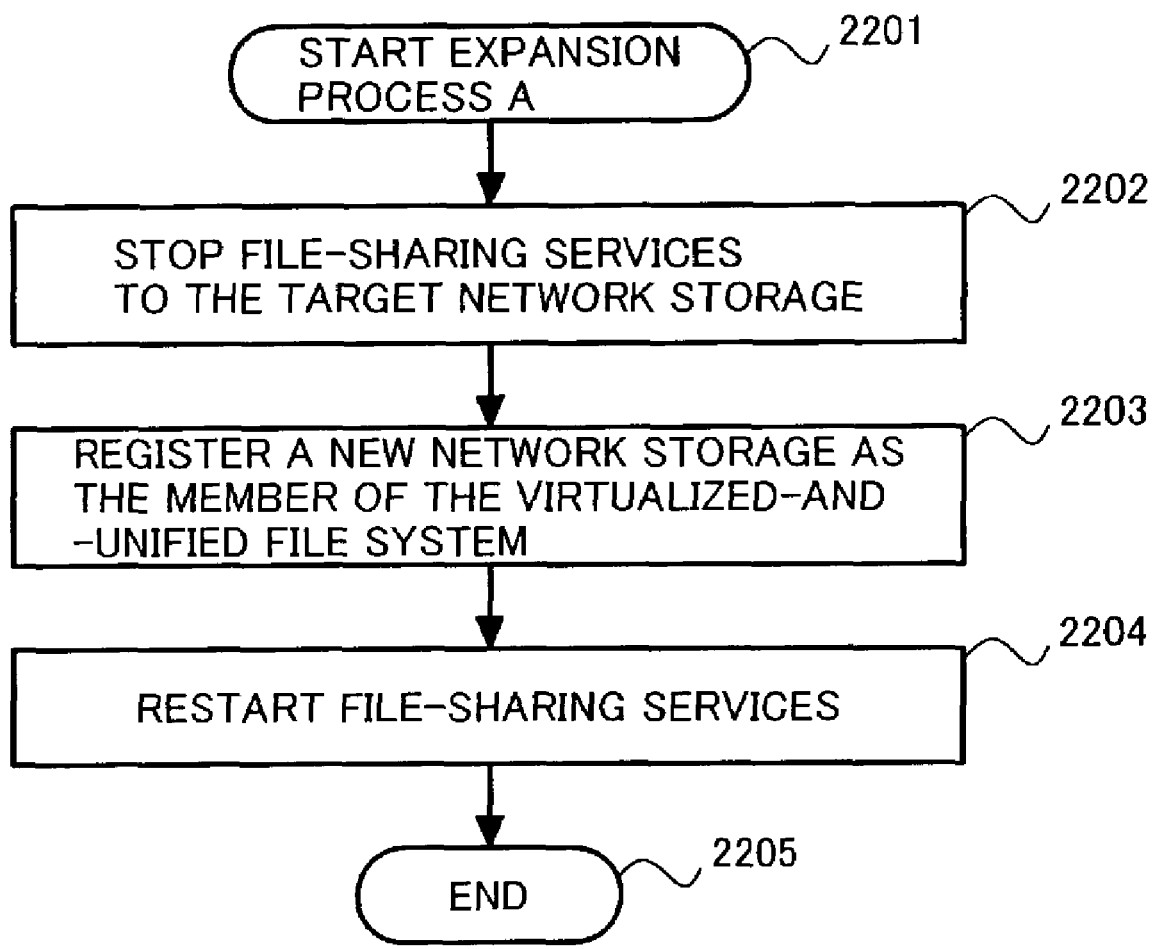
FIG. 22 is a diagram showing the flow of an expansion process A in the second modification.

FIG. 22 shows the detailed flow of the expansion process A illustrated in FIG. 21.

It is assumed here that the network storage to be expanded is the existing network storage 2402 of FIG. 24. In the first process 2202 of the expansion process A (2201), file sharing services to the existing network storage 2402 to be expanded (object of expansion) are stopped. Subsequently, in process 2203, a new network storage is registered in the host table of the network storage to be expanded as a member.

In the member registering process, as shown in FIG. 7, in process 702, name information of the new network storage 2403 and the mount point are set in the host table, and the identifier of the network storage is obtained. When it is found in process 703 that a directories tree structure exists in the unified management directory 2433, the directories tree structure is copied to the storage device 2422 of the new network storage 2403, and the expansion process A is completed. After completion of the expansion process A, a notification indicative of completion is transmitted to the management unit 2441 of the new network storage 2403 and is passed to the client.

Figure 25:
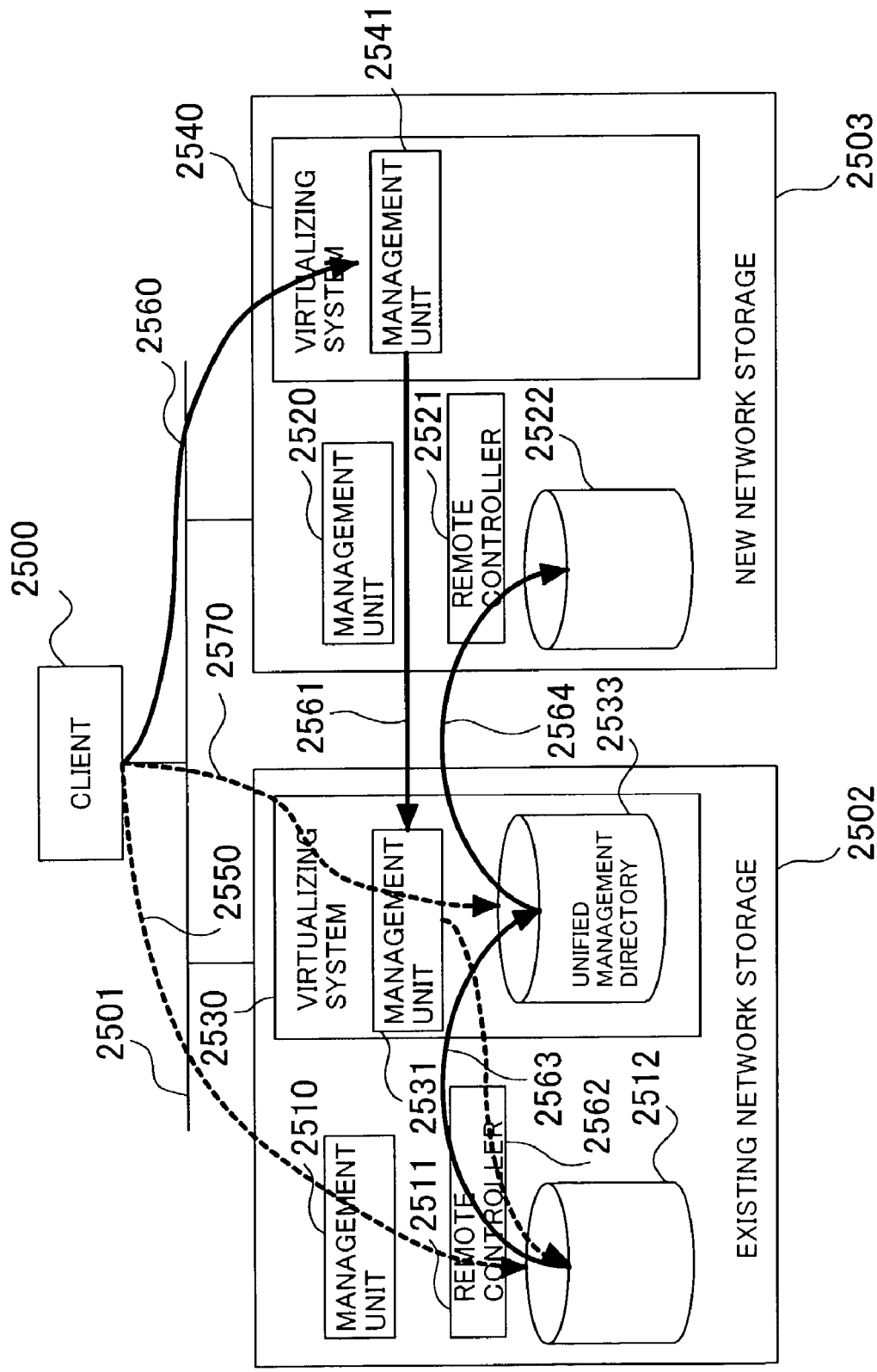
FIG. 25 is a diagram showing a schematic configuration of a network storage system as a target of the expansion process B in the second modification and outline of the expansion procedure.

FIG. 25 shows a schematic configuration of a network storage system as an object of the expansion process B and outline of the add procedure. The schematic configuration of the system is the same as that of FIG. 24 showing the object of the expansion process A. In the expansion process B, a client 2500 accesses a file via a remote controller 2511, not via the virtualizing system 2530 (2550). The virtualizing system 2530 is unused.

In the expansion procedure, when the client issues an expansion request with name information of an existing network storage 2502 to be expanded as an argument to a management unit 2541 of a new network storage 2503 (2560), the management unit 2541 calls and starts a management unit 2531 of the existing network storage 2502 and performs the expansion process (2561). The management unit 2531 accesses a storage device 2512 of the existing network storage 2502 (2562), copies the directories tree structure and the file structure to a unified management directory 2533 (2563) and, after that, copies the directories tree structure of the unified management directory 2533 to a storage device 2522 of the new network storage 2503 (2563).

Figure 23:
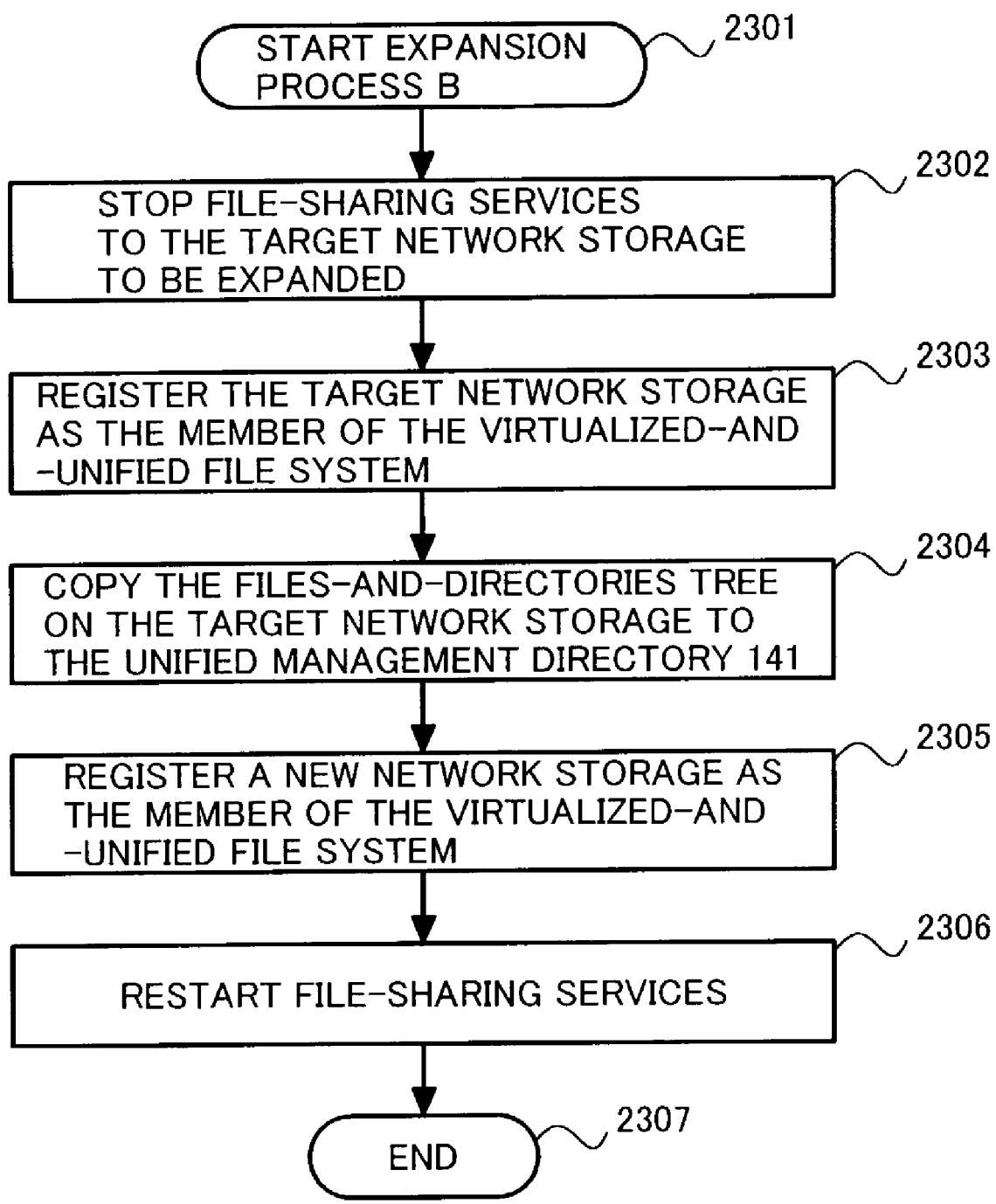
FIG. 23 is a diagram showing the flow of an expansion process B in the second modification.

FIG. 23 shows the detailed flow of the expansion process B illustrated in FIG. 21.

First, in process 2302, file sharing services to the existing network storage 2502 to be expanded are stopped. Subsequently, in process 2303, the existing network storage 2502 is registered as a member in the host table. In this example, since no directories tree structure exists in the unified management directory 2533 of the exiting network storage 2502, the member registering process is finished. In process 2304, the directories tree structure of the storage device 2512 of the existing network storage 2502 is copied into the unified management directory 2533 of the existing network storage 2502. After the copying, in process 2305, the new network storage 2503 is registered as a member into the host table of the existing network storage 2502.

In the member registering process 2305, the directories tree structure of the unified management directory 2533 is copied into the storage device 2522 of the new network storage 2503. After that, in process 2306, file-sharing services to the client are restarted, and the expansion process B is completed (2307). After completion of the expansion process B, a notification of completion is transmitted to the management unit 2541 of the new network storage 2503 and is passed to the client. The destination of the file access request issued from the client 2500 is changed from the remote controller 2511 to a virtualizing system 2530.

Figure 26:
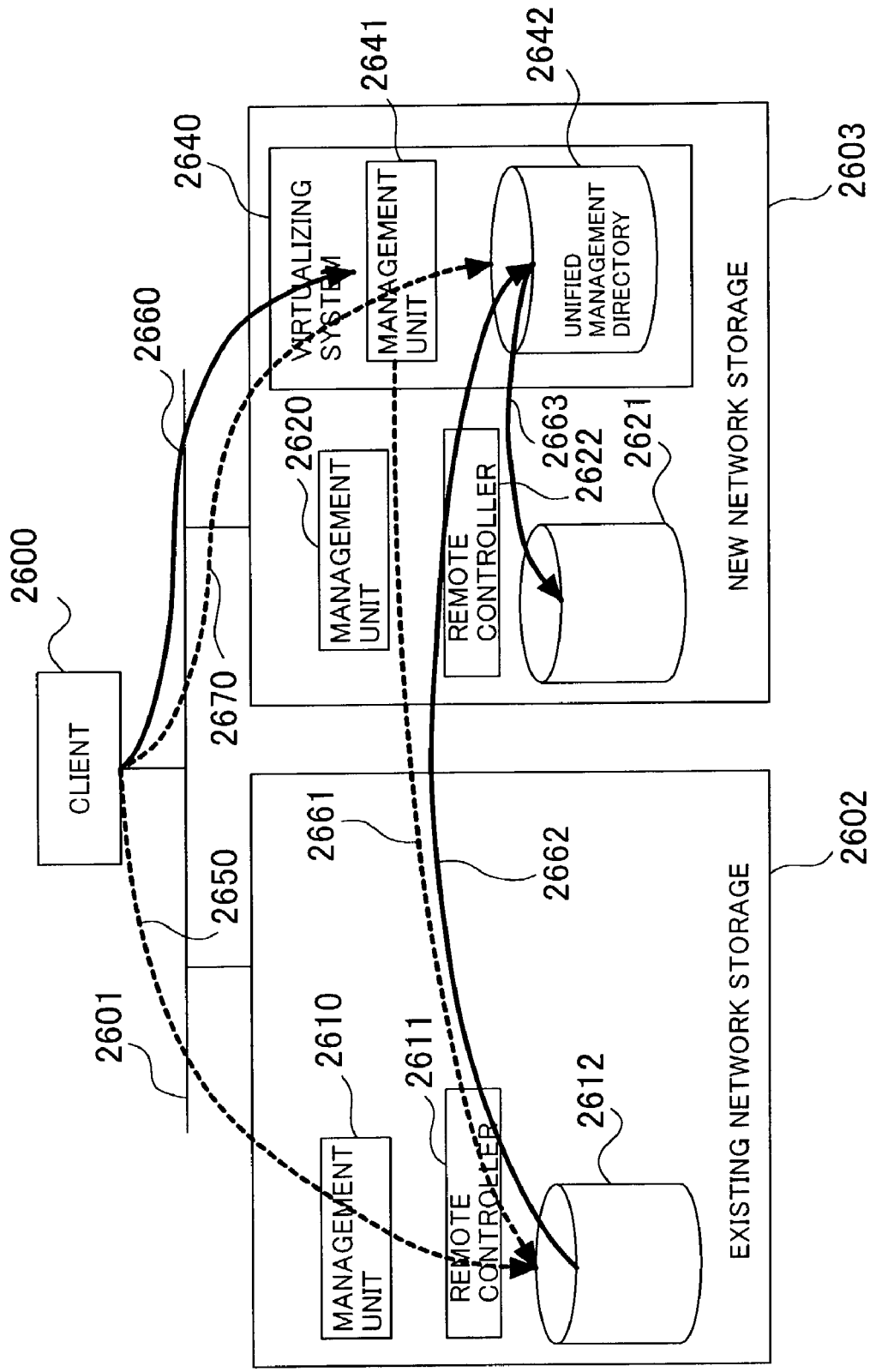
FIG. 26 is a diagram showing a schematic configuration of a network storage system as a target of an expansion process C in the second modification and outline of the expansion procedure.

FIG. 26 shows a schematic configuration of a network storage system in the case where the expansion process C is performed and outline of the expansion procedure.

In the expansion process C, only a new network storage 2603 has a virtualizing system 2640. A client 2600 issues a file access request to a remote controller 2611 of an existing network storage 2602.

In the expansion procedure, when the client 2600 issues an expansion request with name information of the existing network storage 2602 to be expanded as an argument to a management unit 2641 of the new network storage 2603 (2660), the management unit 2641 starts the expansion process (2661). The management unit 2641 accesses a storage device 2612 of the existing network storage 2602 (2661), copies the directories tree structure and the file structure to a unified management directory 2642 (2662) and copies the directories tree structure from the unified management directory 2642 to a storage device 2622 of the new network storage 2603 (2663). After copying, setup information of the existing network storage 2602 and that of the new network storage 2603 are swapped each other, thereby completing the expansion process C. The setup information which has to be swapped is, generally, an IP address and name information. In network environment employing a DNS, it is sufficient to swap only name information.

After completion of the expansion process C, the management unit 2641 transmits a notification of completion to the client. As a result of the expansion process C, the client 2600 issues a file access request to the virtualizing system 2640 of the new network storage 2603. Although the destination of the file access request changes from the existing network storage 2602 to the new network storage 2603, since setup information is swapped, a change does not occur in the setup in the client 2600 Since the flow of the expansion process C is the same as that of FIG. 14, the description will not be repeated here.

In the expansion processes A and B, the virtualizing system exists in the network storage to be expanded. Consequently, unlike the expansion process C, it is unnecessary to swap the setup information between the network storage to be expanded and the new network storage.

In the second modification, a method of expanding the capacity of the existing network storage without making the administrator aware of the management state of the existing network storage to be expanded in the case where the administrator performs a process of adding a new network storage has been described. Also in the case of the replacing process, by using the identification unit 2000, the existing network storage can be replaced irrespective of whether the network storage to be replaced is managed in a unified manner or not.

Although the identification unit 2000 automatically selects one of the expansion processes A, B, and C in the second modification, there is also a method of allowing the administrator to enter identification information. In this case, in a user interface screen of the new network storage 104, the operation states of the network storage to be expanded or replaced are classified into, for example, (A) a state where the virtualizing system is in use, (B) a state where the virtualizing system exists but is not used, and (C) a state where there is no virtualizing system. By allowing the administrator to select one of the states, in the identification unit 2000, the management unit of either the network storage to be expanded or the new network storage can be called to perform the expansion process without inquiring the network storage to be expanded.

4. The Third Modification of the Embodiment

In the foregoing representative embodiment, the setup information of the existing network storage 103 and the setup information of the new network storage 104 read out by the setup information read out unit 132 shown in FIG. 1 are swapped with each other. The setup information includes not only the IP address and name information but also user account information.

In the case where the control of the account information is performed by not the network storage but another computer system on the network, setup information to be replaced does not have to include the account information. However, in the case where the account information is controlled by the network storage, encrypted account information has to be read out from the existing network storage. In the third modification, therefore, in the case where the virtualizing system 123 has an encryption decoding unit and an encryption unit, when the setup information read out unit 132 reads out setup information, encrypted account information is decoded by the encryption decoding unit. In the case of writing the setup information, the setup information encrypted again by the encryption unit is written.

According to the embodiment of the invention, when the capacity of the existing network storage which is not virtualized becomes short and the administrator adds a new network storage, the unification virtualizing apparatus of a new network storage registers the existing network storage as a member of the virtualized-and-unified file system and copies the files-and-directories tree structure on the local file system of the existing network storage, whereby the existing network storage which is not virtualized and the new network storage are managed in a unified manner.

According to the embodiment of the invention, the virtualizing system on the new network storage accesses a local file system of either the existing network storage or the new network storage by using a standard file access protocol in accordance with a corresponding table indicating the relation between the network storage as a member and the unified identifier of the network storage which is managed by the virtualizing system. AS a result, the existing network storage and the new network storage can be managed in a unified manner without setting special information in the existing network storage.

Further, also in the case where the existing network storage is not virtualized, by swapping the setup information of the existing network storage and the setup information of the new network storage by the virtualizing apparatus on the new network storage, the existing network storage which is not virtualized and the new network storage can be managed in a unified manner without changing shared setting information of the network storage in the client computer.

The inventions disclosed by the description of the foregoing embodiment or modifications also include the following features.

(1) a user interface method in a virtualizing system for allowing a client connected to a network to access a unified-and-virtualized file system instead of an existing network storage connected to a virtualizing system and a network storage built in the virtualizing system, including the steps of:

displaying to the client, when the virtualizing system receives basic setup information including name information of the built-in network storage and an identifier on the network, a management menu screen for inputting information for specifying the existing network storage and use purpose designating information of the built-in network storage;

accessing the existing network storage designated by the specifying information and constructing a unified file system when an input notification of the existing network storage specifying information and the information for designating the use purpose of the built-in network storage is received from the client; and displaying a screen indicative of completion of the construction of the unified file system to the client.

(2) a replacement processing method for replacing an old network storage with a new network storage having a virtualizing system, including the steps of:

reading out setup information from the old network storage to be replaced;

registering the old network storage as a member of the virtualizing system;

copying a files-and-directories tree structure of the old network storage to the new network storage;

registering the new network storage as a member of the virtualizing system;

swapping setup information of the old network storage and setup information of the new network storage with each other;

moving all of files held by the old network storage to the new network storage; and deleting the old network storage from members of the virtualizing system after completion of movement, whereby the old network storage is replaced with the new network storage by connecting the new network storage to the network.

(3) in the replacement processing method of (2), the step of moving all of files from the old network storage to the new network storage is performed without stopping a file access request from the client.

(4) a virtualizing method for constructing a virtualized-and-unified file system for presenting, to a client connected to a network, a virtualized network storage instead of at least two old and new network storages distributed on the network, wherein when the client sets basic setup information including an IP address and name information of the new network storage into the new network storage, and sets a command for designating use of the new network storage such as capacity expansion or replacement and name information of the old network storage to be expanded its capacity or replaced, the new network storage reads out the basic setup information including the IP address and name information of the old network storage by using the use designation command and the name information of the old network storage, registers the old network storage as a member of the virtualized-and-unified file system, copies the files-and-directories tree structure of the old network storage to the new network storage in accordance with the basic setup information, and swaps the basic setup information of the old network storage and the basis setup information of the new network storage with each other, thereby constructing the virtualized-and-unified file system by inheriting the files-and-directories tree structure from the old network storage.

(5) a virtualizing method for constructing a virtualized-and-unified file system for presenting, to a client connected to a network, a virtualized network storage instead of at least two old and new network storages distributed on the network, wherein whether the old network storage is virtualized or not is judged and one of the following steps (A), (B), and (C) is executed in accordance with the result of the judgment:

(A) when the old network storage is not virtually unified, dynamically constructs the virtualized-and-unified file system by the virtualizing system of the new network storage;

(B) when the old network storage has a virtualizing system but the system is not used, the new network storage actuates and calls the virtualizing system of the old network storage, and the virtualizing system of the old network storage dynamically constructs a virtualized-and-unified file system; and (C) when the old network storage is virtualized, the new network storage calls the virtualizing system of the old network storage, and the virtualizing system of the old network storage dynamically constructs a virtualized-and-unified file system.

(6) in the virtualizing method of a plurality of network storages according to (5), the step (C) comprises the steps of:

registering the old network storage as a member of the virtualizing system of the old network storage by the old network storage;

copying a files-and-directories tree structure of the old network storage to the virtualizing system of the old network storage by the old network storage; and registering the new network storage as a member of the virtualizing system of the old network storage

What is claimed is:

1. A virtualizing method for constructing a virtualized-and-unified file system including at least an old network storage having a first storage device and a new network storage having a second storage device so as to allow clients connected to a network to access a virtualized network storage instead of the old and the new network storages, the method comprising the steps of:

setting, in a managing unit of said new network storage, a first address and name information of the new network storage as temporary basic setup information of the new network storage;

reading out basic setup information including a second P address and name information of said old network storage from the old network storage by a virtualizing system installed in the new network storage;

registering the name information read out from said old network storage and an identifier of the old network storage which is unique among members of said virtualized network storage, as a member of the virtualized network storage into a host table formed in the new network storage;

copying a file-and-directories tree structure from said old network storage to a unified management directory formed in said new network storage, excepting entity of files in the file-and-directories tree structure;

registering the identifier of said old network storage to said unified management directory at each position corresponding to each of said files in said copied files-and-directories structure, the identifier of said old network storage serving as routing information for routing an access request designating one of said files as an access object;

swapping the temporary basic setup information having been set in said managing unit and the basic setup information stored in said old network storage with each other; and replacing the name information of said old network storage registered in said host table with the name information of said new network storage, thereby enabling the new network storage to respond to said access request on behalf of the old network storage.

2. The virtualizing method according to claim 1, wherein said unified management directory includes dummy files at positions corresponding to the files in said copied files-and-directories tree structure, and said identifier of old network storage being registered to each of said dummy files.

3. The virtualizing method according to claim 1, further including, after the step of registering the identifier of said old network storage to said unified management directory, a step of migrating entity of said files existing in said old network storage to said new network storage.

4. The virtualized method according to claim 1, further comprising the steps of:

receiving a file access request from a client by said virtualizing system, determining a network storage that stores a target file to be accessed, by referring to said management directory by said virtualizing system; and transferring the file access request to the determined network storage by said virtualizing system, whereby an entity of the file designated by the file access request is accessed at the determined network storage.

5. A network storage apparatus provided with a virtualizing system for constructing a virtualized-and-unified file system including at least an external network storage apparatus as an old network storage having a first storage device and the network storage apparatus as a new network storage having a second storage device so as to allow clients connected to a network to access a virtualized network storage instead of the old and the new network storages, the virtualizing system comprising:

a memory unit;

a managing unit for setting therein a first IP address and first name information of the network storage apparatus as temporary basic setup information of said new network storage;

a host table for indicating a corresponding relationship between name information of each member of said virtualized network storage and an identifier of the each member which is unique among members of said virtualized network;

a setup information read out unit for reading out basic setup information including a second IP address and second name information of the old network storage from said external network storage apparatus;

a member information registering unit for registering the second name information and an identifier of the external network storage apparatus which is unique among members of the virtualized network storage, as a member of the virtualized network storage into said host table;

a copy unit for copying a files-and-directories tree structure from said external network storage apparatus to a unified management directory formed in the network storage apparatus, excepting entity of the files in the files-and-directories tree structure;

a mapping unit for registering the identifier of said external network storage apparatus to said unified management directory at each position corresponding to each of said files in said copied files-and-directories tree structure, the identifier of the external network storage apparatus serving as routing information for routing an access request designating one of said files as an access object;

a setup information swapping unit for swapping the temporary basic setup information having been set in said managing unit and the basic setup information stored in said external network storage with each other, and replacing the second name information having been registered in said host table with the first name information; and access request processing unit for determining an object network storage apparatus to be accessed, by referring to said unified management directory when a file access request is received via said network, and transferring the file access request to said external network storage apparatus if the identifier of the external network storage apparatus is registered to said unified management directory as the routing information for routing the received file access request.

* * * * *